(12) United States Patent
Yao et al.

(10) Patent No.: US 12,156,140 B2
(45) Date of Patent: Nov. 26, 2024

(54) PARAMETER CONFIGURATION AND POWER DETERMINATION METHOD, DEVICE AND COMMUNICATION NODE

(71) Applicant: ZTE CORPORATION, Guangdong (CN)

(72) Inventors: Ke Yao, Shenzhen (CN); Zhaohua Lu, Shenzhen (CN); Bo Gao, Shenzhen (CN); YuNgok Li, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/785,133

(22) Filed: Feb. 7, 2020

(65) Prior Publication Data

US 2020/0322893 A1 Oct. 8, 2020

Related U.S. Application Data

(63) Continuation of application No. PCT/CN2018/097261, filed on Jul. 26, 2018.

(30) Foreign Application Priority Data

Aug. 11, 2017 (CN) .......................... 201710687961.8

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0051* (2013.01); *H04L 25/0226* (2013.01);
(Continued)

(58) Field of Classification Search
CPC ............. H04W 52/146; H04W 52/242; H04W 52/365; H04W 56/001; H04W 80/02; H04L 5/0051; H04L 25/0226
See application file for complete search history.

(56) References Cited

U.S. PATENT DOCUMENTS

2016/0105265 A1* 4/2016 Wang .................... H04L 5/0048
370/252
2016/0345272 A1* 11/2016 Eriksson ........... H04W 72/0473
(Continued)

FOREIGN PATENT DOCUMENTS

CA 3064824 A1 * 1/2019 ............... H04B 7/00
CN 101998596 A 3/2011
(Continued)

OTHER PUBLICATIONS

US 9,172,442 B2, 10/2015, Maltsev et al. (withdrawn)
(Continued)

*Primary Examiner* — Huy D Vu
*Assistant Examiner* — Robert Ma
(74) *Attorney, Agent, or Firm* — Foley & Lardner LLP

(57) ABSTRACT

Provided are a parameter configuration and power determination method, device and a communication node. The parameter configuration method includes: configuring at least one transmission parameter setting set for a first communication node, where the transmission parameter setting set includes at least one first transmission parameter set, the first transmission parameter set includes at least one of: a transmission parameter set identifier for identifying the first transmission parameter set, target receiving power configuration information, path loss configuration information, or first indication information for indicating whether to reset a closed-loop power adjustment amount locally maintained by the first communication node. The problem of large overhead of the power control scheme in the NR
(Continued)

multi-beam scenario in the existing art is solved, and achieving the effect of reducing the air interface signaling overhead.

11 Claims, 5 Drawing Sheets

(51) Int. Cl.
  *H04L 25/02* (2006.01)
  *H04W 52/24* (2009.01)
  *H04W 52/36* (2009.01)
  *H04W 56/00* (2009.01)
  *H04W 80/02* (2009.01)

(52) U.S. Cl.
  CPC ....... *H04W 52/242* (2013.01); *H04W 52/365* (2013.01); *H04W 56/001* (2013.01); *H04W 80/02* (2013.01)

(56) References Cited

U.S. PATENT DOCUMENTS

2019/0349864 A1* 11/2019 Zhang ................ H04W 52/325
2020/0205082 A1*  6/2020 Chen ..................... H04L 5/0094

FOREIGN PATENT DOCUMENTS

| | | | | |
|---|---|---|---|---|
| CN | 102026286 | A | 4/2011 | |
| CN | 103037494 | A | 4/2013 | |
| CN | 103096448 | A | 5/2013 | |
| CN | 103326832 | A | 9/2013 | |
| CN | 108134659 | A | 6/2018 | |
| EP | 2741552 | A1 * | 6/2014 | ........... H04L 5/0073 |
| EP | 2 763 471 | A1 | 8/2014 | |
| EP | 2 770 785 | A1 | 8/2014 | |
| JP | 2013-123141 | A | 6/2013 | |
| JP | 2015-520971 | A | 7/2015 | |
| TW | 200527845 | A | 8/2005 | |
| WO | WO-2013/133193 | A1 | 9/2013 | |
| WO | WO-2013/165286 | A1 | 11/2013 | |
| WO | WO-2014/172562 | A1 | 10/2014 | |

OTHER PUBLICATIONS

Huawei, "General considerations on UL power control design", R1-1709948, 3GPP TSG RAN WG1 Ad-Hoc Meeting, Qingdao, China, Jun. 27-30, 2017 (Year: 2017).*

International Search Report and Written Opinion of the International Searching Authority on PCT/CN2018/097261 mailed on Oct. 22, 2018 (9 pages).

Foreign Action other than Search Report on KR Appl. No. 10-2020-7006692 DTD Sep. 18, 2020 (with English translation, 13 pages).

Extended European Search Report for EP Appl. No. 18843929.3, dated Apr. 13, 2021 (10 pages).

Huawei et al.: "General considerations on UL power control design" 3GPP TSG RAN WG1 NR Ad-Hoc Meeting; R1-1709948; Jun. 30, 2017; Qingdao, China (6 pages).

Interdigital Inc.: "On Power Control Processes for Multi Beam Transmission in NR" 3GPP TSG RAN WG1 Meeting #89; R1-1708361; May 19, 2017; Hangzhou, China (4 pages).

First Office Action for JP Appl. No. 2020-507635, dated Jun. 10, 2021 (10 pages).

Huawei et al.: "Discussion on UL SRS transmission power" 3GPP TSG RAN WG1 NR Ad Hoc Meeting; R1-1710459; Qingdao, China, Jun. 30, 2017 (5 pages).

Final Office Action for JP Appl. No. 2020-507635, dated Oct. 12, 2021 (with English translation, 11 pages).

First Office Action for CN Appl. No. 2021102277856, dated Oct. 26, 2021 (with English translation, 15 pages).

Huawei et al.: "Detailed considerations on UL power control design for NR" 3GPP TSG RAN WG1 Meeting #89; R1-1706930; May 19, 2017; Hangzhou, China (5 pages).

Decision on Appeal for JP Appl. No. 2020-507635 (Appeal No. 2022-2129) dated Oct. 12, 2022 (including English translation).

First Office Action for JP Appl. No. 2022-020369, dated Jan. 20, 2023 (with English translation, 9 pages).

Huawei et al., "Consideration on PHR", 3GPP TSG-RAN WG2 Meeting NR#2, R2-1707002, Jun. 29, 2017, Qingdao, China (6 pages).

ZTE, "On NR PHR calculation", 3GPP TSG RAN WG1 NR Ad-Hoc#2, R1-1710210, Jun. 30, 2017, Qingdao, P.R. China (3 pages).

* cited by examiner

PARAMETER CONFIGURATION AND POWER DETERMINATION METHOD, DEVICE AND COMMUNICATION NODE

CROSS-REFERENCE TO RELATED APPLICATIONS

This application claims the benefit of priority under 35 U.S.C. § 120 as a continuation of PCT Patent Application No. PCT/CN2018/097261, filed on Jul. 26, 2018, which claims priority to Chinese patent application No. 201710687961.8, filed on Aug. 11, 2017, the entire disclosure of each of which is incorporated herein by reference.

TECHNICAL FIELD

The present application relates to the field of communications and, in particular, to a parameter configuration method and device, a power determination method and device, and a communication node.

BACKGROUND

Currently, new radio (NR) technology is under development. As the fifth generation mobile communication system, this technology needs to support more types of application scenarios than ever, and also needs to support traditional frequency bands, high-frequency bands and beam modes at the same time, which brings great challenges to the power control design.

The power control in the long term evolution (LTE) is related to many factors, such as a path loss, a target receiving power, a maximum transmitting power, a closed-loop power adjustment amount, a transmission bandwidth, and a transmission rate. In a multi-beam scenario in the NR, part of the power control parameters should be related to the beam or transmitted beam pair link (BPL). To pursue the precise power control, all beam-related power control parameters are best configured and maintained according to the BPL, but BPL-related parameters are sensitive to the channel changing. Any changes in the transmitting or receiving beam will cause updating of BPL-related parameter configuration, leading to the air interface signaling overhead increasing. Moreover, frequent parameter changing is also not beneficial for stability of the closed-loop power control.

To reduce the overhead as much as possible and to meet the requirements that transmitting and receiving resources, especially beam resources, may change frequently in a beam mode, a relationship between beam-related parameters in power control parameters and resources used for the transmission, especially the beam resources, needs to be clarified.

In view of the above technical problems in the related art, no effective solution has yet been proposed.

SUMMARY

Embodiments of the present application provide a parameter configuration method and device, a power determination method and device, and a communication node for at least solving the large overhead of a power control scheme in a NR multi-beam scenario in the existing art.

According to an embodiment of the present application, a parameter configuration method is provided. The method includes: configuring at least one transmission parameter setting set for a first communication node, where the transmission parameter setting set includes at least one first transmission parameter set. The first transmission parameter set includes at least one of: a transmission parameter set identifier for identifying the first transmission parameter set, target receiving power (P0) configuration information, path loss amount (PL) configuration information, or first indication information for indicating whether to reset a closed-loop power adjustment amount locally maintained by the first communication node.

In an embodiment, the P0 configuration information includes at least one of: a value of P0 related to the first communication node, a value of P0 related to a receiving resource, or a value of P0 related to both a transmitting resource and the receiving resource.

In an embodiment, the PL configuration information includes at least one of: indication information of a first downlink reference signal (DL RS) resource, a processing rule for multiple PL values, an uplink reference signal received power (RSRP), or an uplink PL value.

In an embodiment, the processing rule includes at least one of: taking an equivalent mean of the multiple PL values, taking a weighted averaging of the multiple PL values, taking a maximum value of the multiple PL values, or taking a minimum value of the multiple PL values.

In an embodiment, the indication information of the first DL RS resource includes at least one of: a channel state information reference signal (CSI-RS) resource indication (CRI), a synchronization signal block (SS-block) resource indication, or a tracking reference signal (TRS) resource indication.

In an embodiment, the method further includes: carrying the PL configuration information in at least one of the following information: a sounding reference signal resource, a sounding reference signal resource set, or a sounding reference signal resource setting.

In an embodiment, the first transmission parameter set further includes: uplink transmitting resource configuration information for indicating an uplink transmitting resource of the first communication node, where the uplink transmitting resource configuration information includes: indication information of an uplink reference signal (UL RS) resource, and indication information of a second downlink reference signal (DL RS) resource.

In an embodiment, the transmission parameter set identifier or the uplink transmitting resource configuration information is used for sharing all or part of parameters in the first transmission parameter set by different transmission channels or different signals.

In an embodiment, the transmission parameter setting set further includes at least one of: a transmission parameter setting set identifier for identifying the transmission parameter setting set, a cell-specific P0, a waveform-specific maximum power back off value, a configuration parameter related to a physical frame structure parameter, a service-type-specific configuration parameter, or a power headroom report (PHR) configuration parameter.

In an embodiment, the PHR configuration parameter includes at least one of: a PHR switch, a reporting period for a PHR, a minimum reporting interval for the PHR, a PL changing amount threshold, a PHR changing amount threshold, or a type of the PHR.

In an embodiment, the method further includes at least one of: configuring, for the first communication node, second indication information for indicating whether the closed-loop power adjustment amount locally maintained by the first communication node and corresponding to the transmission parameter setting set is reset, where the second indication information is valid for all first transmission parameter sets in the transmission parameter setting set; or configuring, for the first communication node, third indication information for indicating whether the closed-loop power adjustment amount locally maintained by the first communication node and corresponding to the first communication node is reset, where the third indication information is valid for all first transmission parameter sets in all transmission parameter setting sets of the first communication node.

In an embodiment, the method further includes: specifying, by using a predetermined rule, whether to reset the closed-loop power adjustment amount locally maintained by the first communication node.

In an embodiment, specifying whether to reset the closed-loop power adjustment amount locally maintained by the first communication node by using the predetermined rule includes at least one of: when configuring the first transmission parameter set, resetting the closed-loop power adjustment amount locally maintained by the first communication node corresponding to the first transmission parameter set; when the target receiving power configuration information in configured the first transmission parameter set changes, resetting the closed-loop power adjustment amount locally maintained by the first communication node corresponding to the first transmission parameter set; when the path loss configuration information in the configured first transmission parameter set changes, resetting the closed-loop power adjustment amount locally maintained by the first communication node corresponding to the first transmission parameter set; or when the uplink transmitting resource of the first communication node changes, resetting the closed-loop power adjustment amount locally maintained by the first communication node corresponding to the uplink transmitting resource.

In an embodiment, after configuring the at least one transmission parameter setting set for the first communication node, the method further includes: indicating the transmission parameter setting set in a predetermined manner or by the transmission parameter setting set identifier.

In an embodiment, the method further includes: indicating an uplink transmitting resource to the first communication node through higher layer signaling or physical layer signaling or a media access control element (MAC CE).

In an embodiment, the first transmission parameter set has an association relationship with the uplink transmitting resource.

In an embodiment, the association relationship is a default association relationship, or the association relationship is configured for the first communication node by at least one of: the physical layer signaling, the MAC CE or the higher layer signaling.

In an embodiment, after configuring the at least one transmission parameter setting set for the first communication node, the method further includes: indicating at least one configured transmission parameter setting set to the first communication node through the uplink transmitting resource or a transmission parameter setting set identifier for identifying the transmission parameter setting set.

In an embodiment, after indicating the at least one configured transmission parameter setting set to the first communication node, the method further includes: sending a transmission power control command to the first communication node; where the transmission power control command includes one or more power adjustment amounts delta corresponding to one or more uplink transmitting resources.

In an embodiment, a number of the uplink transmitting resources is related to a number of uplink transmitting resources of an independent power control of a current transmission, where the uplink transmitting resource is indicated by a transmission parameter setting set identifier or scheduling information carried in downlink control information (DCI).

In an embodiment, a number of power adjustment amounts delta included in the transmission power control command is determined by at least one of: the number of power adjustment amounts is determined according to a number of uplink transmitting resources of the current transmission, where each uplink transmitting resource corresponds to one delta; in a case of multi-input multi-output (MIMO) flow specific power control, the number of power adjustment amounts is a sum of MIMO flows which support independent MIMO flow specific power control of all of the uplink transmitting resources; or in a case of multi-input multi-output (MIMO) flow specific power control, the number of power adjustment amounts is a sum of MIMO layers which support independent MIMO flow specific power control of all of the uplink transmitting resources.

In an embodiment, the method further includes: configuring, for the first communication node, a manner of reporting a PHR by the first communication node, where the manner includes at least one of: separately reporting the PHR for each loop of a closed-loop power control configured by the first communication node, or for a plurality of loops configured by the first communication node, jointly reporting a joint PHR of the plurality of loops.

In an embodiment, in the case where the manner is separately reporting the PHR for each loop of a closed-loop power control configured by the first communication node, a trigger condition for triggering the first communication node to report the PHR includes at least one of: a PL change of a specified loop exceeds a first predetermined threshold; configuration of the specified loop changes; a first power control parameter of a power control parameter identifier corresponding to the specified loop is reconfigured; the closed-loop power adjustment amount locally maintained by the first communication node which corresponds to the specified loop is reset except due to failure; a difference between the PHR and a previously-reported PHR is greater than a second predetermined threshold; or the PHR satisfies at least one of conditions: the PHR is 0, the PHR is less than 0, or the PHR is less than a third predetermined threshold.

In an embodiment, in the case where the manner is for a plurality of loops configured by the first communication node, jointly reporting a joint PHR of the plurality of loops, a trigger condition configured for triggering the first communication node to report the PHR includes at least one of: relative to a previous reporting time of the joint PHR of the plurality of loops, a sum of path loss amount changes of all loops of the plurality of loops exceeds a fourth predetermined threshold; configuration of at least one loop of the plurality of loops changes; for at least one loop of the plurality of loops, a first power control parameter of a corresponding power control parameter identifier is reconfigured; for at least one loop of the plurality of loops, the closed-loop power adjustment amount locally maintained by the first communication node is reset except due to failure; a difference between the joint PHR and the previously-reported PHR report is greater than a fifth predetermined threshold; or the joint PHR satisfies at least one of conditions: the joint PHR is 0, the joint PHR is less than 0, or the joint PHR is less than a third predetermined threshold.

According to an embodiment of the present application, a power determination method is provided. The method includes: acquiring a specified transmission parameter set identifier or scheduling information; where the scheduling information includes an uplink transmitting resource; determining, from among at least one first transmission parameter set provided in advance, one or more first transmission parameter sets corresponding to the uplink transmitting resource or the specified transmission parameter set identifier according to the acquired specified transmission parameter set identifier or uplink transmitting resource, where the first transmission parameter set includes at least one of: a transmission parameter set identifier for identifying the first transmission parameter set, target receiving power (P0) configuration information, path loss amount (PL) configuration information, or first indication information for indicating whether to reset a closed-loop power adjustment amount locally maintained by a first communication node; and determining a power of a current uplink transmission according to one determined first transmission parameter set In an embodiment, the P0 configuration information includes at least one of: a value of P0 related to the first communication node, a value of P0 related to a receiving resource, or a value of P0 related to both a transmitting resource and the receiving resource.

In an embodiment, the PL configuration information includes at least one of: indication information of a first downlink reference signal (DL RS) resource, a processing rule for multiple PL values, an uplink reference signal received power (RSRP), or an uplink PL value.

In an embodiment, the processing rule includes at least one of: taking an equivalent mean of the multiple PL values, taking a weighted averaging of the multiple PL values, taking a maximum value of the multiple PL values, or taking a minimum value of the multiple PL values.

In an embodiment, the indication information of the first DL RS resource includes at least one of: a channel state information reference signal (CSI-RS) resource indication (CRI), a synchronization signal block (SS-block) resource indication, or a tracking reference signal (TRS) resource indication.

In an embodiment, before acquiring the specified transmission parameter set identifier or the scheduling information, the method further includes: acquiring at least one transmission parameter setting set, where the transmission parameter setting set includes at least one first transmission parameter set.

In an embodiment, in a case of determining one transmission parameter set corresponding to the transmission parameter set identifier in at least one transmission parameter set provided in advance according to the acquired transmission parameter set identifier, the first transmission parameter set further includes: uplink transmitting resource configuration information for indicating an uplink transmitting resource of the first communication node, where the uplink transmitting resource configuration information includes: indication information of an uplink reference signal (UL RS) resource, and indication information of a second downlink reference signal (DL RS) resource.

In an embodiment, the transmission parameter setting set further includes at least one of: a transmission parameter setting set identifier for identifying the transmission parameter setting set, a cell-specific P0, a waveform-specific maximum power back off value, a configuration parameter related to a physical frame structure parameter, a service-type-specific configuration parameter, or a power headroom report (PHR) configuration parameter.

In an embodiment, the PHR configuration parameter includes at least one of: a PHR switch, a reporting period for a PHR, a minimum reporting interval for the PHR, a PL changing amount threshold, a PHR changing amount threshold, or a type of the PHR.

In an embodiment, after determining the power of the current uplink transmission according to one determined first transmission parameter set, the method further includes: determining the uplink transmitting resource of the current transmission according to at least one of: the transmission parameter setting set identifier, or the scheduling information.

In an embodiment, before determining the power of the current uplink transmission according to one determined first transmission parameter set, the method further includes: acquiring a specified first transmission parameter set; and updating the first transmission parameter set corresponding to the transmission parameter set identifier of the specified first transmission parameter according to the acquired specified first transmission parameter set.

In an embodiment, determining the power of the current uplink transmission according to one determined first transmission parameter set includes: for a first transmission parameter set, calculating a PL of an uplink transmission according to the PL configuration information; maintaining the closed-loop power adjustment amount locally maintained by the first communication node in the first transmission parameter set; and determining the power of the current uplink transmission according to the P0 configuration information, the path loss amount of the uplink transmission, and the closed-loop power adjustment amount locally maintained by the first communication node.

In an embodiment, maintaining the closed-loop power adjustment amount locally maintained by the first communication node in the first transmission parameter set includes: receiving a transmission power control command; and adjusting the closed-loop power adjustment amount delta locally maintained by the first communication node according to a power adjustment amount carried by the transmission power control command In an embodiment, calculating the path loss amount of the uplink transmission according to the path loss configuration information includes: using the uplink transmitting resources to receive reference signal RS on a first downlink reference signal resource and obtaining the path loss value of the reference signal; where the first downlink reference signal resource is a downlink reference signal resource indicated by indication information of the first downlink reference signal resource included in the path loss configuration information; and processing the measured path loss amount according to a processing rule for a plurality of path loss amounts included in a path loss configuration information, and obtaining the path loss amount of the uplink transmission.

In an embodiment, the method further includes at least one of: in a case where the first transmission parameter set includes the first indication information, determining whether to reset the closed-loop power adjustment amount locally maintained by the first communication node corresponding to the first transmission parameter set according to the first indication information included in the first transmission parameter set; determining whether to reset the closed-loop power adjustment amount locally maintained by the first communication node according to a predetermined rule configured by a second communication node for the first communication node. The predetermined rule includes at least one of: every time configuring the first transmission parameter set, resetting the closed-loop power adjustment amount locally maintained by the first communication node corresponding to the first transmission parameter set; every time the P0 configuration information in the configured first transmission parameter set changes, resetting the closed-loop power adjustment amount locally maintained by the first communication node corresponding to the first transmission parameter set; every time the PL configuration information in the configured first transmission parameter set changes, resetting the closed-loop power adjustment amount locally maintained by the first communication node corresponding to the first transmission parameter set; or every time the uplink transmitting resource of the first communication node changes, resetting the closed-loop power adjustment amount locally maintained by the first communication node corresponding to the uplink transmitting resource.

In an embodiment, the method further includes: reporting a power headroom report to the first communication node in a predetermined reporting manner, where the predetermined reporting manner includes at least one of: separately reporting the power headroom report for each loop of a closed-loop power control, or for a plurality of loops, jointly reporting a joint power headroom report of the plurality of loops.

In an embodiment, in a case where the predetermined reporting manner is separately reporting the power headroom report for each loop of a closed-loop power control, a trigger condition for triggering the reporting of the power headroom report includes at least one of: a path loss amount change of a specified loop exceeds a first predetermined threshold; configuration of the specified loop changes; a first power control parameter of a power control parameter identifier corresponding to the specified loop is reconfigured; the closed-loop power adjustment amount locally maintained by the first communication node which corresponds to the specified loop is reset except due to failure; a difference between the power headroom report and a previously-reported power headroom report is greater than a second predetermined threshold; or the power headroom report satisfies at least one of conditions: the power headroom report is 0, the power headroom report is less than 0, or the power headroom report is less than a third predetermined threshold.

In an embodiment, in a case where the predetermined reporting manner is for a plurality of loops jointly reporting the joint power headroom report of the plurality of loops, a trigger condition configured for triggering the reporting of the power headroom report includes at least one of: relative to a previous reporting time of the joint power headroom report of the plurality of loops, a sum of path loss amount changes of all loops of the plurality of loops exceeds a fourth predetermined threshold; configuration of at least one loop of the plurality of loops changes; for at least one loop of the plurality of loops, a first power control parameter of a corresponding power control parameter identifier is reconfigured; for at least one loop of the plurality of loops, the closed-loop power adjustment amount locally maintained by the first communication node is reset except due to failure; a difference between the joint power headroom report and the joint power headroom report previously reported is greater than a fifth predetermined threshold; or the joint power headroom report satisfies at least one of conditions: the joint power headroom report is 0, the joint power headroom report is less than 0, or the joint power headroom report is less than a sixth predetermined threshold.

According to an embodiment of the present application, a parameter configuration device is provided. The device includes: a configuration module, which is configured to configure at least one transmission parameter setting set for a first communication node. The transmission parameter setting set includes at least one first transmission parameter set, and the first transmission parameter set includes at least one of: a transmission parameter set identifier for identifying the first transmission parameter set, target receiving power (P0) configuration information, path loss amount (PL) configuration information, or first indication information for indicating whether to reset a closed-loop power adjustment amount locally maintained by the first communication node.

In an embodiment, the P0 configuration information includes at least one of: a value of a target receiving power related to the first communication node, a value of the target receiving power related to a receiving resource, or a value of the target receiving power related to both a transmitting resource and the receiving resource; and where the path loss configuration information includes at least one of: indication information of a first downlink reference signal resource, a processing rule for a plurality of path loss amounts, an uplink reference signal received power, or an uplink path loss amount.

In an embodiment, the processing rule includes at least one of: taking an equivalent mean of the multiple path loss amounts, taking a weighted averaging of the multiple path loss amounts, taking a maximum value of the multiple path loss amounts, or taking a minimum value of the multiple path loss amounts.

In an embodiment, the indication information of the first DL RS resource includes at least one of: a channel state information reference signal (CSI-RS) resource indication (CRI), a synchronization signal block (SS-block) resource indication, or a tracking reference signal (TRS) resource indication.

In an embodiment, the first transmission parameter set further includes: uplink transmitting resource configuration information for indicating an uplink transmitting resource of the first communication node, where the uplink transmitting resource configuration information includes: indication information of an uplink reference signal (UL RS) resource, and indication information of a second downlink reference signal (DL RS) resource.

In an embodiment, the transmission parameter setting set further includes at least one of: a transmission parameter setting set identifier for identifying the transmission parameter setting set, a cell-specific P0, a waveform-specific maximum power back off value, a configuration parameter related to a physical frame structure parameter, a service-type-specific configuration parameter, or a power headroom report (PHR) configuration parameter.

According to an embodiment of the present application, a power determination device is provided. The device includes: an acquisition module and a second determination module. The acquisition module is configured to acquire a specified transmission parameter set identifier or scheduling information. The scheduling information includes an uplink transmitting resource; a first determination module, which is configured to determine, from at least one first transmission parameter set provided in advance, one or more first transmission parameter sets corresponding to the specified transmission parameter set identifier or uplink transmitting resource according to the acquired specified transmission parameter set identifier or uplink transmitting resource, where the first transmission parameter set includes at least one of: a transmission parameter set identifier for identifying the first transmission parameter set, target receiving power (P0) configuration information, path loss amount (PL) configuration information, or first indication information for indicating whether to reset a closed-loop power adjustment amount locally maintained by a first communication node. The second determination module is configured to determine a power of a current uplink transmission according to one determined first transmission parameter set.

In an embodiment, the P0 configuration information includes at least one of: a value of a target receiving power related to the first communication node, a value of the target receiving power related to a receiving resource, or a value of the target receiving power related to both a transmitting resource and the receiving resource; and where the path loss configuration information includes at least one of: indication information of a first downlink reference signal (DL RS) resource, a processing rule for a plurality of path loss amounts, an uplink reference signal received power (RSRP), or an uplink path loss amount.

In an embodiment, the processing rule includes at least one of: taking an equivalent mean of the multiple path loss amounts, taking a weighted average of the multiple path loss amounts, taking a maximum value of the multiple path loss amounts, or taking a minimum value of the plurality of path loss amounts.

In an embodiment, the indication information of the first DL RS resource includes at least one of: a channel state information reference signal (CSI-RS) resource indication (CRI), a synchronization signal block (SS-block) resource indication, or a tracking reference signal (TRS) resource indication.

In an embodiment, the first transmission parameter set further includes: uplink transmitting resource configuration information for indicating an uplink transmitting resource of the first communication node, where the uplink transmitting resource configuration information includes: indication information of an uplink reference signal (UL RS) resource, and indication information of a second downlink reference signal (DL RS) resource.

In an embodiment, the acquisition module is configured to acquire at least one transmission parameter setting set, where the transmission parameter setting set includes at least one first transmission parameter set.

In an embodiment, the transmission parameter setting set further includes at least one of: a transmission parameter setting set identifier for identifying the transmission parameter setting set, a cell-specific P0, a waveform-specific maximum power back off value, a configuration parameter related to a physical frame structure parameter, a service-type-specific configuration parameter, or a power headroom report (PHR) configuration parameter.

According to another embodiment of the present application, a communication node is further provided. The communication nod includes a processor, which is configured to execute programs. The programs, when executed, perform the parameter configuration method of any one of the embodiments described above.

According to an embodiment of the present application, a communication node is further provided. The communication nod includes a processor, which is configured to execute programs. The programs, when executed, perform the power determination method of any one of the embodiments described above.

According to an embodiment of the present application, a storage medium is provided. The storage medium includes stored programs which, when executed, perform any method described above.

According to an embodiment of the present application, a processor is provided. The processor is configured to execute programs which, when executed, perform any method described above.

Through this application, the first communication node is configured with at least one first transmission parameter set, so the first transmission parameter set may be flexible selected, thereby achieving a smoothed power control with a small air interface signaling overhead during frequent beam switching. Therefore, the problem of large overhead of the power control scheme in the NR multi-beam scenario in the existing art can be solved and the effect of reducing the air interface signaling overhead is achieved.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

The present application will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment One

The embodiment of the present application provides a parameter configuration method.

Figure 1:
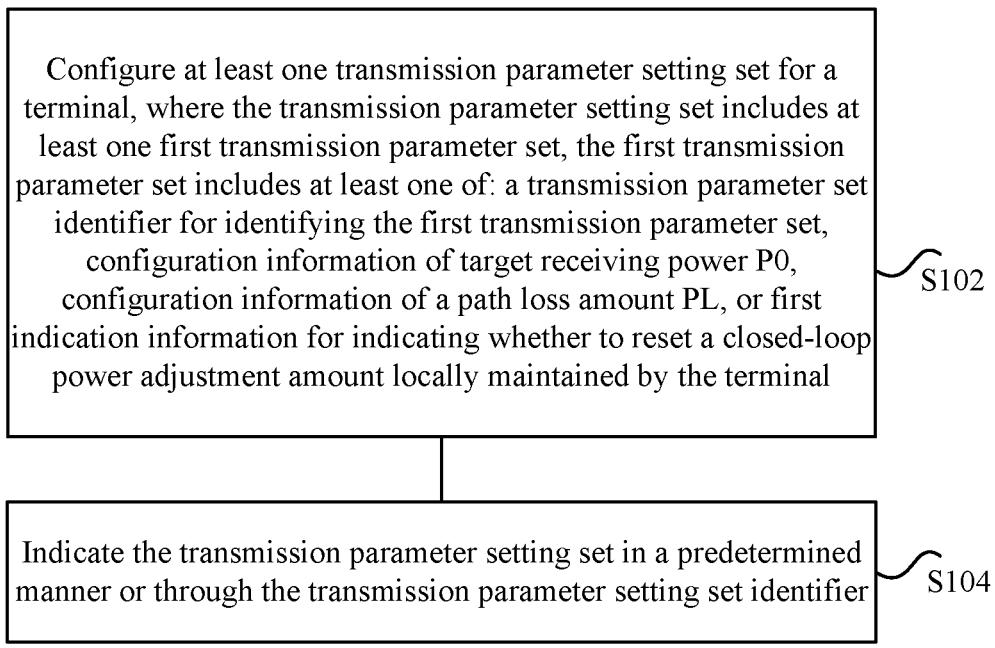
FIGS. 1(a) and 1(b) are flowcharts of parameter configuration methods provided by embodiments of the present application.
Figure 1:
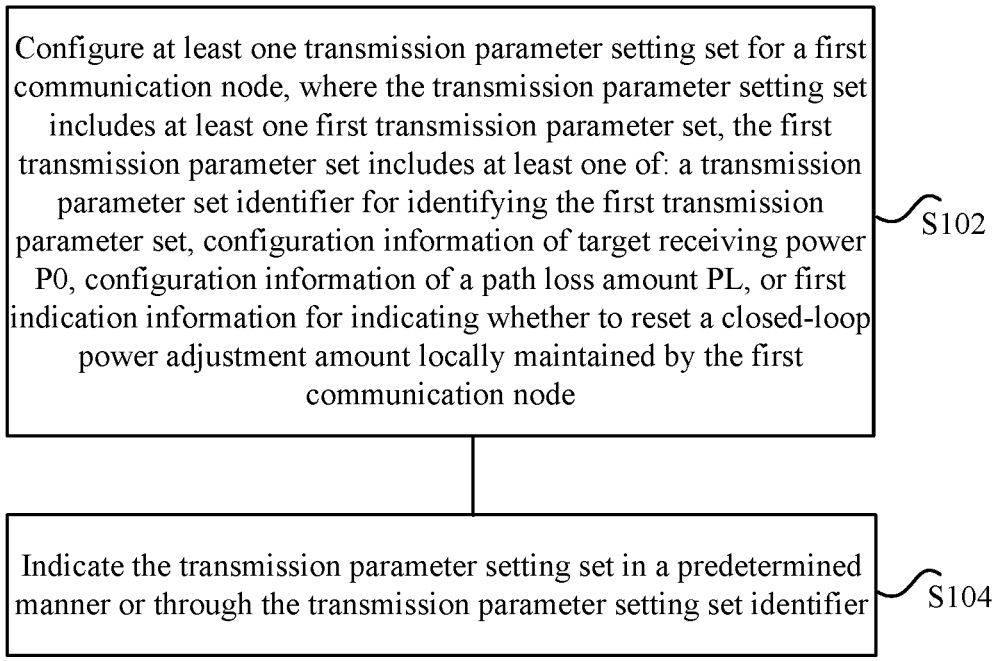

FIGS. 1(a) and 1(b) are flowcharts of parameter configuration methods provided by embodiments of the present application. As shown in FIGS. 1(a) and 1(b), the method includes the steps described below.

In step S102, at least one transmission parameter setting set is configured for a first communication node, where the transmission parameter setting set includes at least one first transmission parameter set. The first transmission parameter set includes at least one of: a transmission parameter set identifier for identifying the first transmission parameter set, target receiving power (P0) configuration information, path loss amount (PL) configuration information, or first indication information for indicating whether to reset a closed-loop power adjustment amount locally maintained by the first communication node.

In step S104, the transmission parameter setting set is indicated in a predetermined manner or by the transmission parameter setting set identifier.

Through the above steps, since the first communication node is configured with at least one first transmission parameter set, the transmission parameter set can be flexible selected, thereby achieving a smoothed power control with a small air interface signaling overhead when beams are frequently switched. Therefore, the problem of large overhead of the power control scheme in the NR multi-beam scenario in the existing art can be solved and the effect of reducing the air interface signaling overhead is achieved.

It is to be noted that the above method may only include the step S102, and may also include the steps S102 and S104, but the method is not limited thereto.

It is to be noted that the above step S102 may configure at least one transmission parameter setting set in various ways. For example, the at least one transmission parameter setting set may be configured to the first communication node together, or the at least one transmission parameter setting set may be configured to the first communication node one by one, and parameters in the transmission parameter setting set may also be configured to the first communication node one by one, which is not limited thereto.

It is to be noted that the P0 configuration information may include at least one of: a value of P0 related to the first communication node, a value of P0 related to a receiving resource, or a value of P0 related to both a transmitting resource and the receiving resource.

It is to be noted that the receiving resource may be a receiving beam or a receiving beam group, but the receiving resource is not limited thereto. The transmitting resource may be a sending beam or a sending beam group. The value of P0 related to the receiving resource may be considered that different receiving resources correspond to different P0 values, i.e., the value of P0 is different for the different receiving beam or the different receiving beam group. The value of P0 related to both the transmitting resource and the receiving resource may be a dedicated configuration of a link corresponding to a pair of the sending beam and the receiving beam, but is not limited thereto.

It is to be noted that the PL configuration information includes at least one of: indication information of a first downlink reference signal (DL RS) resource, a processing rule for multiple path loss amounts, an uplink reference signal received power (RSRP), or an uplink PL.

It is to be noted that the processing rule includes at least one of: taking an equivalent mean of the multiple path loss amounts, taking a weighted average of the multiple path loss amounts, taking a maximum value of the multiple path loss amounts, or taking a minimum value of the plurality of path loss amounts. The indication information of the first DL RS resource may include at least one of: a channel state information reference signal (CSI-RS) resource indication (CRI), a synchronization signal block (S S-block) resource indication, or a tracking reference signal (TRS) resource indication.

In an embodiment of the present application, the first transmission parameter set may further include: uplink transmitting resource configuration information for indicating an uplink transmitting resource of the first communication node, where the uplink transmitting resource configuration information includes: indication information of an uplink reference signal (UL RS) resource, and indication information of a second downlink reference signal (DL RS) resource.

It is to be noted that the uplink transmitting resource may be a transmitting beam (a TX beam) or a group of transmitting beams (a TX beam group), but is not limited thereto.

It is to be noted that in a case where the uplink transmitting resource configuration information includes the indication information of the second DL RS resource, the indication information of the second DL RS resource is used for instructing the first communication node to take a beam with which a downlink reference signal reception is best as the sending beam.

It is to be noted that the method may further include: carrying the path loss configuration information in at least one of the following information: a sounding reference signal resource, a sounding reference signal resource set, or a sounding reference signal resource setting.

In an embodiment of the present application, the transmission parameter setting set further includes at least one of: a transmission parameter setting set identifier for identifying the transmission parameter setting set, a cell-specific P0, a waveform-specific maximum power back off value, a configuration parameter related to a physical frame structure parameter, a service-type-specific configuration parameter, or a power headroom report (PHR) configuration parameter.

It is to be noted that the transmission parameter set identifier or the uplink transmitting resource configuration information is used for sharing all or part of parameters in the first transmission parameter set by different transmission channels or different signals.

It is to be noted that the first transmission parameter set may include uplink transmitting resource indication information, or may not include the uplink transmitting resource indication information. It is to be noted that in the case where the first transmission parameter set includes the uplink transmitting resource indication information, the first transmission parameter set or the transmission parameter setting set may be indicated to the first communication node through the uplink transmitting resource, and in the case where the first transmission parameter set does not include the uplink transmitting resource indication information, the first transmission parameter set may be indicated through the transmission parameter set identifier or the transmission parameter setting set may be indicated through the transmission parameter setting set identifier.

It is to be noted that, the PHR configuration parameter may include at least one of: a PHR switch, a reporting period for a PHR, a minimum reporting interval for the PHR, a PL changing amount threshold, a PHR changing amount threshold, or a type of the PHR.

In an embodiment of the present application, the method may further include at least one of: configuring, for the first communication node, second indication information for indicating whether the closed-loop power adjustment amount locally maintained by the first communication node and corresponding to the transmission parameter setting set is reset; where the second indication information is valid for all first transmission parameter sets in the transmission parameter setting set; or configuring, for the first communication node, third indication information for indicating whether the closed-loop power adjustment amount locally maintained by the first communication node and corresponding to the first communication node is reset; where the third indication information is valid for all first transmission parameter sets in all transmission parameter setting sets of the first communication node.

It is to be noted that the second indication information may be configured through the transmission parameter setting set, or may also be configured through other manners, but it is not limited thereto.

In an embodiment of the present application, the method may further include: using a predetermined rule to specifying whether to reset the closed-loop power adjustment amount locally maintained by the first communication node.

It is to be noted that using a predetermined rule to specifying whether to rest the closed-loop power adjustment amount locally maintained by the first communication node may include at least one of: when configuring the first transmission parameter set, resetting the closed-loop power adjustment amount locally maintained by the first communication node corresponding to the first transmission parameter set; when the target receiving power configuration information in configured the first transmission parameter set changes, resetting the closed-loop power adjustment amount locally maintained by the first communication node corresponding to the first transmission parameter set; when the path loss configuration information in the configured first transmission parameter set changes, resetting the closed-loop power adjustment amount locally maintained by the first communication node corresponding to the first transmission parameter set; or when the uplink transmitting resource of the first communication node changes, resetting the closed-loop power adjustment amount locally maintained by the first communication node corresponding to the uplink transmitting resource. The P0 configuration information, the PL configuration information are correlated with whether to reset the closed-loop power adjustment amount maintained locally by the first communication node through the first transmission parameter set, thereby further reducing the overhead.

In an embodiment of the present application, the step S104 may be represented as: indicating the transmission parameter setting set in a predetermined manner or by the transmission parameter setting set identifier.

In an embodiment of the present application, the method may further include: indicating an uplink transmitting resource to the first communication node through higher layer signaling or physical layer signaling or a MAC CE.

It is to be noted that the first transmission parameter set has an association relationship with the uplink transmitting resource.

It is to be noted that the association relationship is a default association relationship, or the association relationship is configured for the first communication node by at least one of: the physical layer signaling, the MAC CE or the higher layer signaling.

In an embodiment of the present application, after the step S102, the method may further include: indicating at least one configured transmission parameter setting set to the first communication node through the uplink transmitting resource or a transmission parameter setting set identifier for identifying the transmission parameter setting set.

In an embodiment of the present application, after the step S104, the method may further include: sending a transmission power control command to the first communication node; where the transmission power control command includes one or more power adjustment amounts delta corresponding to one or more uplink transmitting resources.

It is to be noted that a number of the uplink transmitting resources is related to a number of uplink transmitting resources of an independent power control of a current transmission, where the uplink transmitting resource is indicated by a transmission parameter setting set identifier or scheduling information carried in downlink control information (DCI).

In an embodiment of the present application, a number of power adjustment amounts delta included in the transmission power control command may be determined by at least one of the following manners. The number of power adjustment amounts is determined according to a number of uplink transmitting resources of the current transmission, where each uplink transmitting resource corresponds to one delta. In a case of multi-input multi-output (MIMO) flow specific power control, the number of power adjustment amounts is a sum of MIMO flows which support independent MIMO flow specific power control of all of the uplink transmitting resources. In a case of multi-input multi-output (MIMO) flow specific power control, the number of power adjustment amounts is a sum of MIMO layers which support independent MIMO flow specific power control of all of the uplink transmitting resources.

In an embodiment of the present application, the method may further include: configuring, for the first communication node, a manner of reporting a PHR by the first communication node, where the manner includes at least one of: separately reporting the PHR for each loop of a closed-loop power control configured by the first communication node, or for a plurality of loops configured by the first communication node, jointly reporting a joint PHR of the plurality of loops.

It is to be noted that in the case where the manner is separately reporting the PHR for each loop of a closed-loop power control configured by the first communication node, a trigger condition configured for triggering the first communication node to report the PHR includes at least one of: a PL amount change of a specified loop exceeds a first predetermined threshold; configuration of the specified loop changes; a first power control parameter of a power control parameter identifier corresponding to the specified loop is reconfigured; the closed-loop power adjustment amount locally maintained by the first communication node which corresponds to the specified loop is reset except due to failure; a difference between the PHR and a previously-reported PHR is greater than a second predetermined threshold; or the PHR satisfies at least one of conditions: the PHR is 0, the PHR is less than 0, or the PHR is less than a third predetermined threshold.

It is to be noted that in the case where the manner is for multiple loops configured by the first communication node, jointly reporting a joint PHR of the plurality of loops, a trigger condition configured for triggering the first communication node to report the PHR include at least one of: relative to a previous reporting time of the joint PHR of the plurality of loops, a sum of path loss amount changes of all loops of the plurality of loops exceeds a fourth predetermined threshold; configuration of at least one loop of the plurality of loops changes; for at least one loop of the plurality of loops, a first power control parameter of a corresponding power control parameter identifier is reconfigured; for at least one loop of the plurality of loops, the closed-loop power adjustment amount locally maintained by the first communication node is reset except due to failure; a difference between the joint PHR and the previously-reported PHR report is greater than a fifth predetermined threshold; or the joint PHR satisfies at least one of conditions: the joint PHR is 0, the joint PHR is less than 0, or the joint PHR is less than a third predetermined threshold.

It is to be noted that the first predetermined threshold and the fourth predetermined threshold may be a PL changing amount threshold. The first predetermined threshold and the fourth predetermined threshold may be the same or different, and may be set according to actual situations, but are not limited thereto. The second predetermined threshold, the third predetermined threshold, the fifth predetermined threshold, and the sixth predetermined threshold may be the PHR changing threshold, and the values may be the same or different, but are not limited thereto.

It is to be noted that the above steps may, but may not necessarily, be executed by a second communication node, but it is not limited thereto.

It is to be noted that the first communication node may be a terminal, and the second communication node may be a base station, but it is not limited thereto.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solution provided by the present application substantially, or the part contributing to the existing art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present application.

Embodiment Two

Figure 2:
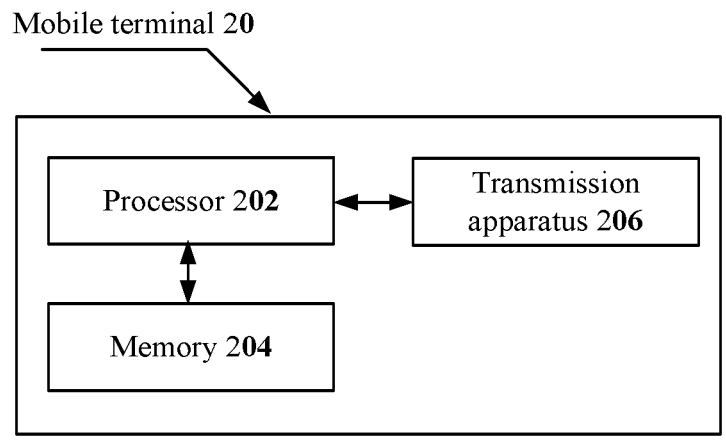
FIG. 2 is a structural block diagram of hardware of a mobile terminal of a power determination method provided by an embodiment of the present application.

A method embodiment provided by the embodiment two of the present application may be executed on a mobile terminal, a computer terminal or other similar computing apparatuses. Taking the method to be executed in the mobile terminal as an example, FIG. 2 is a structural block diagram of hardware of a mobile terminal of a power determination method according to the embodiment of the present application. As shown in FIG. 2, a mobile terminal 20 may include one or more (only one is shown in the figure) processors 202 (the processor 202 may include, but is not limited to, a microprocessor MCU, a programmable logic device such as FPGA, or other processing devices), a memory 204 used for storing data, and a transmission device 206 used for implementing a communication function. It is to be understood by those skilled in the art that the structure shown in FIG. 2 is merely illustrative, and not intended to limit the structure of the electronic apparatus described above. For example, the mobile terminal 20 may further include more or fewer components than that shown in FIG. 2, or may have a configuration different from the configuration shown in FIG. 2.

The memory 204 may be used for storing software programs and modules of application software, such as program instructions/modules corresponding to the power determination method in the embodiment of the present application. The processor 202 executes the software programs and modules stored in the memory 204 so as to perform various function applications and data processing, that is, to implement the method described above. The memory 204 may include a high-speed random access memory, or may further include a nonvolatile memory such as one or more magnetic storage apparatuses, flash memories or other nonvolatile solid-state memories. In some examples, the memory 204 may further include memories that are remotely disposed with respect to the processors 202. These remote memories may be connected to the mobile terminal 20 via a network. Examples of the preceding network include, but are not limited to, the Internet, an intranet, a local area network, a mobile communication network and a combination thereof.

The transmission device 206 is configured to receive and transmit data via a network. Specific examples of such a network described above may include a wireless network provided by a communication provider of the mobile terminal 20. In one example, the transmission apparatus 206 includes a network interface controller (NIC), which may be connected to other network devices via a base station and thus is capable of communicating with the Internet. In one example, the transmission apparatus 206 may be a radio frequency (RF) module, which is used for communicating with the Internet in a wireless way.

Figure 3:
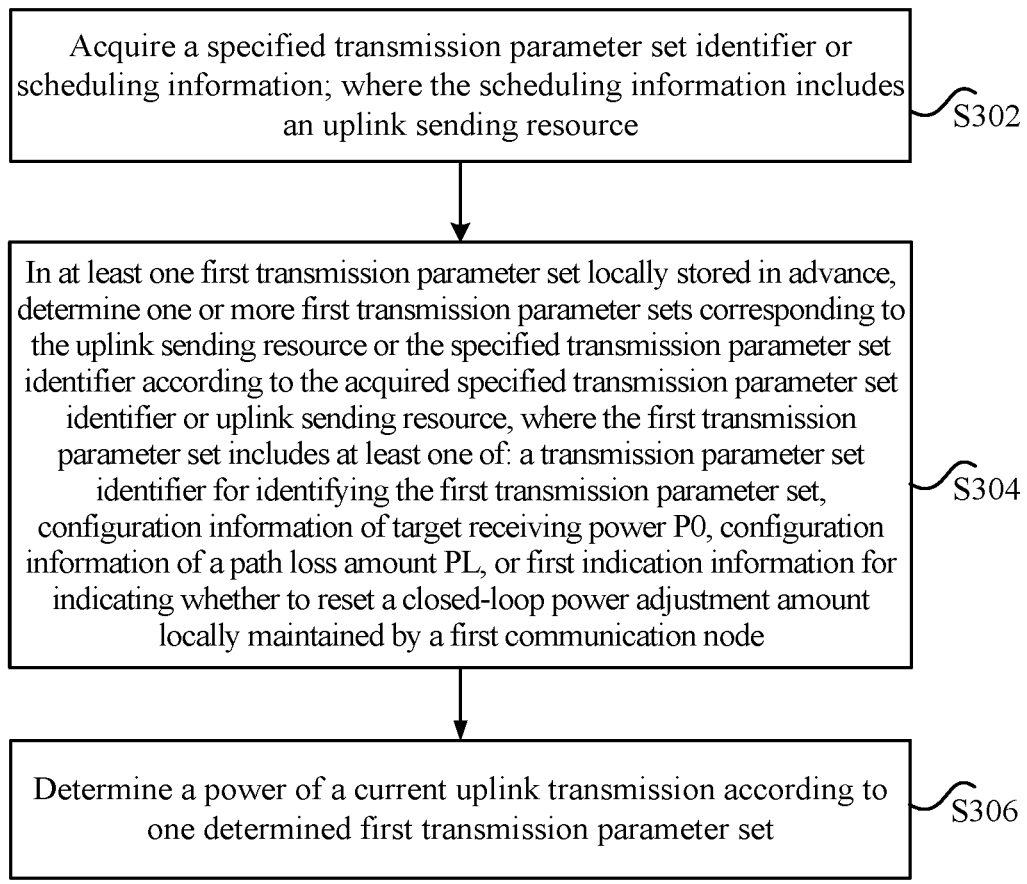
FIG. 3 is a flowchart of a power determination method provided by an embodiment of the present application.

The embodiment provides a power determination method to be executed in the mobile terminal described above. FIG. 3 is a flowchart of the power determination method according to the embodiment of the present application. As shown in FIG. 3, the method includes the steps described below.

In step S302, a specified transmission parameter set identifier or scheduling information is acquired; where the scheduling information includes an uplink transmitting resource.

In step S304, from among at least one first transmission parameter set provided in advance, one or more first transmission parameter sets corresponding to the uplink transmitting resource or the specified transmission parameter set identifier are determined according to the acquired specified transmission parameter set identifier or uplink transmitting resource, where the first transmission parameter set includes at least one of: a transmission parameter set identifier for identifying the first transmission parameter set, target receiving power (P0) configuration information, path loss amount (PL) configuration information, or first indication information for indicating whether to reset a closed-loop power adjustment amount locally maintained by a first communication node.

In step S306, a power of a current uplink transmission is determined according to one determined first transmission parameter set.

Through the above steps, at least one first transmission parameter set is stored at the first communication node in advance, and one or more first transmission parameter sets are determined based on the specified transmission parameter set identifier or scheduling information, so the transmission parameter set is flexibly selected, thereby achieving a smoothed power control with a small air interface signaling overhead during frequent beam switching. Therefore, the problem in the existing art that the overhead of the power control scheme in the NR multi-beam scenario is large can be solved and the effect of reducing the air interface signaling overhead is achieved.

It is to be noted that the step S302 may be represented as: the specified transmission parameter set identifier or scheduling information is acquired through physical layer signaling or an MAC CE.

It is to be noted that the P0 configuration information may include at least one of: a value of P0 related to the first communication node, a value of P0 related to a receiving resource, or a value of P0 related to both a transmitting resource and the receiving resource.

It is to be noted that the PL configuration information includes at least one of: indication information of a first downlink reference signal (DL RS) resource, a processing rule for multiple path loss amounts, an uplink reference signal received power (RSRP), or an uplink PL.

It is to be noted that the processing rule includes at least one of: taking an equivalent mean of the multiple path loss amounts, taking a weighted average of the multiple path loss amounts, taking a maximum value of the multiple path loss amounts, or taking a minimum value of the plurality of path loss amounts. The indication information of the first DL RS resource may include at least one of: a channel state information reference signal (CSI-RS) resource indication (CRI), a synchronization signal block (S S-block) resource indication, or a tracking reference signal (TRS) resource indication.

In an embodiment of the present application, before the step S302, the method further includes acquiring at least one transmission parameter setting set, where the transmission parameter setting set includes at least one first transmission parameter set.

It is to be noted that in the case where one transmission parameter set corresponding to the transmission parameter set identifier is determined from among the at least one transmission parameter set provided in advance according to the acquired transmission parameter set identifier, the first transmission parameter set may further include: uplink transmitting resource configuration information for indicating an uplink transmitting resource of the first communication node, where the uplink transmitting resource configuration information includes: indication information of an uplink reference signal (UL RS) resource, and indication information of a second downlink reference signal (DL RS) resource.

In an embodiment of the present application, the transmission parameter setting set may further include at least one of: a transmission parameter setting set identifier for identifying the transmission parameter setting set, a cell-specific P0, a waveform-specific maximum power back off value, a configuration parameter related to a physical frame structure parameter, a service-type-specific configuration parameter, or a power headroom report (PHR) configuration parameter.

It is to be noted that, the PHR configuration parameter may include at least one of: a PHR switch, a reporting period for a PHR, a minimum reporting interval for the PHR, a PL changing amount threshold, a PHR changing amount threshold, or a type of the PHR.

It is to be noted that after the step S306, the method further includes determining the uplink transmitting resource of the current transmission according to at least one of: the transmission parameter setting set identifier, or the scheduling information.

In an embodiment of the present application, before the step S306, the method may further include: acquiring a specified first transmission parameter set; and updating, in the at least one first transmission parameter set according to the acquired specified first transmission parameter set, the first transmission parameter set corresponding to the transmission parameter set identifier of the specified first transmission parameter.

It is to be noted that, determining the power of the current uplink transmission according to one determined first transmission parameter set may be represented as: for a first transmission parameter set, calculating a PL of an uplink transmission according to the PL configuration information; maintaining the closed-loop power adjustment amount locally maintained by the first communication node in the first transmission parameter set; and determining the power of the current uplink transmission according to the P0 configuration information, the path loss amount of the uplink transmission, and the closed-loop power adjustment amount locally maintained by the first communication node.

It is to be noted that maintaining the closed-loop power adjustment amount locally maintained by the first communication node in the first transmission parameter set may include: receiving a transmission power control command; and adjusting the closed-loop power adjustment amount delta locally maintained by the first communication node according to a power adjustment amount delta carried by the transmission power control command.

It is to be noted that calculating the path loss amount of the uplink transmission according to the path loss configuration information includes: using the uplink transmitting resources to receive reference signal RS on a first downlink reference signal resource and obtaining the path loss value of the reference signal, where the first downlink reference signal resource is a downlink reference signal resource indicated by indication information of the first downlink reference signal resource included in the PL configuration information; and processing the measured path loss amount according to a processing rule for multiple path loss amounts comprised in the PL configuration information, and obtaining the path loss amount of the uplink transmission.

In an embodiment of the present application, the method further includes at least one of: in a case where the first transmission parameter set includes the first indication information, determining whether to reset the closed-loop power adjustment amount locally maintained by the first communication node corresponding to the first transmission parameter set according to the first indication information included in the first transmission parameter set; or determining whether to reset the closed-loop power adjustment amount locally maintained by the first communication node according to a predetermined rule configured by a second communication node for the first communication node. The predetermined rule includes at least one of: every time configuring the first transmission parameter set, resetting the closed-loop power adjustment amount locally maintained by the first communication node corresponding to the first transmission parameter set; every time the target receiving power configuration information in the configured first transmission parameter set changes, resetting the closed-loop power adjustment amount locally maintained by the first communication node corresponding to the first transmission parameter set; every time the path loss configuration information in the configured first transmission parameter set changes, resetting the closed-loop power adjustment amount locally maintained by the first communication node corresponding to the first transmission parameter set; or every time the uplink transmitting resource of the first communication node changes, resetting the closed-loop power adjustment amount locally maintained by the first communication node corresponding to the uplink transmitting resource.

In an embodiment of the present application, the method further includes: reporting a power headroom report to the first communication node in a predetermined reporting manner, where the predetermined reporting manner includes at least one of: separately reporting the power headroom report for each loop of a closed-loop power control, or jointly reporting a joint power headroom report for multiple loops.

It is to be noted that in the case where the predetermined reporting manner is separately reporting the power headroom report for each loop of a closed-loop power control, a trigger condition for triggering the reporting of the power headroom report includes at least one of: a PL change of a specified loop exceeds a first predetermined threshold; configuration of the specified loop changes; a first power control parameter of a power control parameter identifier corresponding to the specified loop is reconfigured; the closed-loop power adjustment amount locally maintained by the first communication node which corresponds to the specified loop is reset except due to failure; a difference between the power headroom report and a previously-reported power headroom report is greater than a second predetermined threshold; or the power headroom report satisfies at least one of conditions: the power headroom report is 0, the power headroom report is less than 0, or the power headroom report is less than a third predetermined threshold.

It is to be noted that in the case where the predetermined reporting manner is jointly reporting the joint power headroom report for multiple loops, a trigger condition for triggering the reporting of the power headroom report includes at least one of: relative to a previous reporting time of the joint power headroom report of the multiple loops, a sum of path loss amount changes of all loops of the multiple loops exceeds a fourth predetermined threshold; configuration of at least one loop of the multiple loops changes; for at least one loop of the multiple loops, a first power control parameter of a corresponding power control parameter identifier is reconfigured; for at least one loop of the multiple loops, the closed-loop power adjustment amount locally maintained by the first communication node is reset except due to failure; a difference between the joint power headroom report and the joint power headroom report previously reported is greater than a fifth predetermined threshold; or the joint power headroom report satisfies at least one of conditions: the joint power headroom report is 0, the joint power headroom report is less than 0, or the joint power headroom report is less than a sixth predetermined threshold.

In an implementation mode, the above steps may, but may not necessarily, be executed by a first communication node.

It should be noted that the first communication node may be a terminal, and the second communication node may be a base station, but it is not limited thereto.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solution provided by the present application substantially, or the part contributing to the existing art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present application.

Embodiment Three

This embodiment further provides a parameter configuration device configured to implement the above-mentioned embodiment and preferred implementation modes. What has been described will not be repeated. As used below, a term "module" may be software, hardware or a combination thereof capable of implementing predetermined functions. The device in the embodiment described below is preferably implemented by software, but implementation by hardware or by a combination of software and hardware is also possible and conceived.

Figure 4:
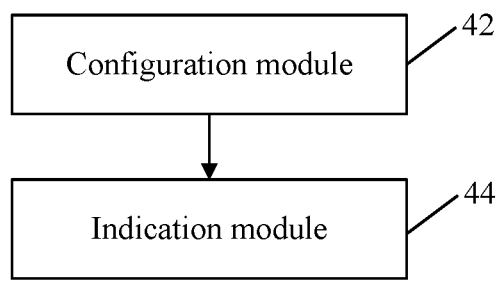
FIG. 4 is a block diagram of a parameter configuration device provided by an embodiment of the present application.

FIG. 4 is a block diagram of a parameter configuration device according to an embodiment of the present application. As shown in FIG. 4, the device includes: a configuration module 42 and an indication module 44.

The configuration module 42 is configured to configure at least one transmission parameter setting set for a first communication node. The transmission parameter setting set includes at least one first transmission parameter set, and the first transmission parameter set includes at least one of: a transmission parameter set identifier for identifying the first transmission parameter set, target receiving power (P0) configuration information, path loss amount (PL) configuration information, or first indication information for indicating whether to reset a closed-loop power adjustment amount locally maintained by the first communication node.

The indication module 44 is connected to the configuration module 42, and is configured to indicate at least one configured first transmission parameter set to the first communication node.

Through the above device, at least one transmission parameter setting set is configured for the first communication node, so the transmission parameter setting set may be flexible selected, thereby achieving a smoothed power control with a small air interface signaling overhead when beams are frequently switched. Therefore, the problem of large overhead of the power control scheme in the NR multi-beam scenario in the existing art can be solved and the effect of reducing the air interface signaling overhead is achieved.

It is to be noted that the above device may only include the configuration module 42, or may include both the configuration module 42 and the indication module 44, but the device is not limited thereto.

It is to be noted that the P0 configuration information may include at least one of: a value of P0 related to the first communication node, a value of P0 related to a receiving resource, or a value of P0 related to both a transmitting resource and the receiving resource.

It is to be noted that the receiving resource may be a receiving beam or a receiving beam group, but is not limited thereto. The transmitting resource may be a sending beam or a sending beam group. The value of P0 related to the receiving resource may be considered that different receiving resources correspond to different P0 values, i.e., the value of P0 is different for the different receiving beam or the different receiving beam group. The value of P0 related to both the transmitting resource and the receiving resource may be a dedicated configuration of links corresponding to a pair of the sending beam and the receiving beam, but is not limited thereto.

It is to be noted that the PL configuration information includes at least one of: indication information of a first downlink reference signal (DL RS) resource, a processing rule for multiple path loss amounts, an uplink reference signal received power (RSRP), or an uplink PL.

It is to be noted that the processing rule includes at least one of: taking an equivalent mean of the multiple path loss amounts, taking a weighted average of the multiple path loss amounts, taking a maximum value of the multiple path loss amounts, or taking a minimum value of the plurality of path loss amounts. The indication information of the first DL RS resource may include at least one of: a channel state information reference signal (CSI-RS) resource indication (CRI), a synchronization signal block (S S-block) resource indication, or a tracking reference signal (TRS) resource indication.

In an embodiment of the present application, the first transmission parameter set may further include: uplink transmitting resource configuration information for indicating an uplink transmitting resource of the first communication node, where the uplink transmitting resource configuration information includes: indication information of an uplink reference signal (UL RS) resource, and indication information of a second downlink reference signal (DL RS) resource.

It should be noted that in a case where the uplink transmitting resource configuration information includes the indication information of the second DL RS resource, the indication information of the second DL RS resource is used for instructing the first communication node to take a beam by using which a downlink reference signal reception is best as the sending beam.

It is to be noted that the PL configuration information may carry the path loss configuration information in at least one of the following information: a sounding reference signal resource, a sounding reference signal resource set, or a sounding reference signal resource setting.

In an embodiment of the present application, the transmission parameter setting set further includes at least one of: a transmission parameter setting set identifier for identifying the transmission parameter setting set, a cell-specific P0, a waveform-specific maximum power back off value, a configuration parameter related to a physical frame structure parameter, a service-type-specific configuration parameter, or a power headroom report (PHR) configuration parameter.

It is to be noted that the transmission parameter set identifier or the uplink transmitting resource configuration information is used for sharing all or part of parameters in the first transmission parameter set by different transmission channels or different signals.

It is to be noted that the first transmission parameter set may include uplink transmitting resource indication information, or may not include the uplink transmitting resource indication information. It is to be noted that in the case where the first transmission parameter set includes the uplink transmitting resource indication information, the first transmission parameter set or the transmission parameter setting set may be indicated to the first communication node through the uplink transmitting resource, and in the case where the first transmission parameter set does not include the uplink transmitting resource indication information, the first transmission parameter set may be indicated through the transmission parameter set identifier or the transmission parameter setting set may be indicated through the transmission parameter setting set identifier.

It is to be noted that, the PHR configuration parameter may include at least one of: a PHR switch, a reporting period for a PHR, a minimum reporting interval for the PHR, a PL changing amount threshold, a PHR changing amount threshold, or a type of the PHR.

In an embodiment of the present application, the configuration module 42 may be further configured to perform at least one of: configuring, for the first communication node, second indication information for indicating whether to reset the closed-loop power adjustment amount locally maintained by the first communication node and corresponding to the transmission parameter setting set, where the second indication information is valid for all first transmission parameter sets in the transmission parameter setting set; or configuring, for the first communication node, third indication information for indicating whether to reset the closed-loop power adjustment amount locally maintained by the first communication node and corresponding to the first communication node, where the third indication information is valid for all first transmission parameter sets in all transmission parameter setting sets of the first communication node.

It is to be noted that the second indication information may be configured through the transmission parameter setting set, or may also be configured through other manners, but it is not limited thereto.

In an embodiment of the present application, the configuration module 44 may further be used for: using a predetermined rule to specify whether to reset the closed-loop power adjustment amount locally maintained by the first communication node.

It is to be noted that the predetermined rule may include at least one of: when configuring the first transmission parameter set, resetting the closed-loop power adjustment amount locally maintained by the first communication node corresponding to the first transmission parameter set; when the target receiving power configuration information in configured the first transmission parameter set changes, resetting the closed-loop power adjustment amount locally maintained by the first communication node corresponding to the first transmission parameter set; when the path loss configuration information in the configured first transmission parameter set changes, resetting the closed-loop power adjustment amount locally maintained by the first communication node corresponding to the first transmission parameter set; or when the uplink transmitting resource of the first communication node changes, resetting the closed-loop power adjustment amount locally maintained by the first communication node corresponding to the uplink transmitting resource. The P0 configuration information, the PL configuration information, and the information about whether to reset the closed-loop power adjustment amount maintained locally by the first communication node are correlated through the first transmission parameter set, thereby further reducing the overhead.

In an embodiment of the present application, the indication module 44 may be configured to indicate the transmission parameter setting set in a predetermined manner or through the transmission parameter setting set identifier.

In an embodiment of the present application, the indication module 44 may be further configured to indicate an uplink transmitting resource to the first communication node through higher layer signaling or physical layer signaling or a MAC CE.

It is to be noted that the first transmission parameter set has an association relationship with the uplink transmitting resource.

It is to be noted that the association relationship is a default association relationship, or the association relationship is configured for the first communication node by at least one of: the physical layer signaling, the MAC CE or the higher layer signaling.

In an embodiment of the present application, the indication module 44 may be further configured to indicate at least one configured transmission parameter setting set to the first communication node through the uplink transmitting resource or a transmission parameter setting set identifier for identifying the transmission parameter setting set.

In an embodiment of the present application, the device may further include: a sending module. The sending module is connected to the indication module 44, and is configured to send a transmission power control command to the first communication node; where the transmission power control command includes one or more power adjustment amounts delta corresponding to one or more uplink transmitting resources.

It is to be noted that a number of the uplink transmitting resources is related to a number of uplink transmitting resources of an independent power control of a current transmission, where the uplink transmitting resource is indicated by a transmission parameter setting set identifier or scheduling information carried in downlink control information.

In an embodiment of the present application, the number of power adjustment amounts delta included in the transmission power control command may be determined by at least one of: the number of power adjustment amounts is determined according to a number of uplink transmitting resources of the current transmission, where each uplink transmitting resource corresponds to one delta; in a case of multi-input multi-output (MIMO) flow specific power control, the number of power adjustment amounts is a sum of MIMO flows which support independent MIMO flow specific power control of all of the uplink transmitting resources; or in a case of multi-input multi-output (MIMO) flow specific power control, the number of power adjustment amounts is a sum of MIMO layers which support independent MIMO flow specific power control of all of the uplink transmitting resources.

In an embodiment of the present application, the configuration module 44 may be further configured to configure, for the first communication node, a manner of reporting a PHR, where the manner includes at least one of: separately reporting the PHR for each loop of a closed-loop power control configured by the first communication node, or jointly reporting a joint PHR for a plurality of loops configured by the first communication node.

It is to be noted that in the case where the manner is separately reporting the PHR for each loop of a closed-loop power control configured by the first communication node, a trigger condition configured for triggering the first communication node to report the PHR includes at least one of: a PL change of a specified loop exceeds a first predetermined threshold; configuration of the specified loop changes; a first power control parameter of a power control parameter identifier corresponding to the specified loop is reconfigured; the closed-loop power adjustment amount locally maintained by the first communication node and corresponding to the specified loop is reset due to a reason rather than failure; a difference between the PHR and a previously-reported PHR is greater than a second predetermined threshold; or the PHR satisfies at least one of conditions: the PHR is 0, the PHR is less than 0, or the PHR is less than a third predetermined threshold.

It is to be noted that in the case where the manner is jointly reporting a joint PHR for multiple loops configured by the first communication node, a trigger condition configured for triggering the first communication node to report the PHR include at least one of: relative to a previous reporting time of the joint PHR of the plurality of loops, a sum of path loss amount changes of all loops of the plurality of loops exceeds a fourth predetermined threshold; configuration of at least one loop of the plurality of loops changes; for at least one loop of the plurality of loops, a first power control parameter of a corresponding power control parameter identifier is reconfigured; for at least one loop of the plurality of loops, the closed-loop power adjustment amount locally maintained by the first communication node is reset except due to failure; a difference between the joint PHR and the previously-reported PHR report is greater than a fifth predetermined threshold; or the joint PHR satisfies at least one of conditions: the joint PHR is 0, the joint PHR is less than 0, or the joint PHR is less than a third predetermined threshold.

It is to be noted that the first predetermined threshold and the fourth predetermined threshold may be a PL changing amount threshold. The first predetermined threshold and the fourth predetermined threshold may be the same or different, and may be set according to actual situations, but are not limited thereto. The second predetermined threshold, the third predetermined threshold, the fifth predetermined threshold, and the sixth predetermined threshold may be the PHR changing threshold, and the values may be the same or different, but are not limited thereto.

It is to be noted that the preceding device may, but may not necessarily, be disposed in the second communication node.

It should be noted that the first communication node may be a terminal, and the second communication node may be a base station, but it is not limited thereto.

The embodiment of the present application further provides a communication node. The communication node includes: a processor, which configured to execute programs. The programs, when executed, perform the method described in the embodiment one.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Four

Figure 5:
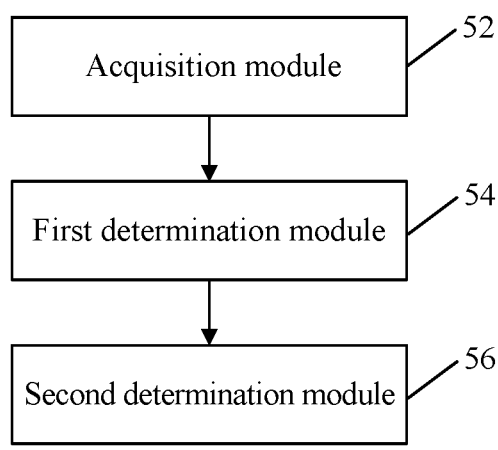
FIG. 5 is a structural block diagram of a power determination device provided by an embodiment of the present application.

The embodiment of the present application further provides a power determination device. FIG. 5 is a structural block diagram of a power determination device provided by an embodiment of the present application. As shown in FIG. 5, the device includes: an acquisition module 52, a first determination module 54, and a second determination module 56.

The acquisition module 52 is configured to acquire a specified transmission parameter set identifier or scheduling information, where the scheduling information includes an uplink transmitting resource.

The first determination module 54 is connected to the acquisition module 52, and is configured to determine, from among at least one first transmission parameter set provided in advance, one or more first transmission parameter sets corresponding to the specified transmission parameter set identifier or uplink transmitting resource according to the acquired specified transmission parameter set identifier or uplink transmitting resource. The first transmission parameter set includes at least one of: a transmission parameter set identifier for identifying the first transmission parameter set, P0 configuration information, PL configuration information, or first indication information for indicating whether to reset a closed-loop power adjustment amount locally maintained by a first communication node.

The second determination module 56 is connected to the first determination module 54, and is configured to determine a power of a current uplink transmission according to one determined first transmission parameter set.

Through the above device, at least one first transmission parameter set is stored at the first communication node in advance, and one or more first transmission parameter sets are determined based on the specified transmission parameter set identifier or scheduling information, so the transmission parameter setting set is flexibly selected, thereby achieving a smoothed power control with a small air interface signaling overhead when beams are frequently switched. Therefore, the problem of large overhead of the power control scheme in the NR multi-beam scenario in the existing art can be solved and the effect of reducing the air interface signaling overhead is achieved.

It is to be noted that the specified transmission parameter setting set identifier or the scheduling information may be obtained through physical layer signaling or the MAC CE, but is not limited to thereto.

It is to be noted that the P0 configuration information may include at least one of: a value of P0 related to the first communication node, a value of P0 related to a receiving resource, or a value of P0 related to both a transmitting resource and the receiving resource.

It is to be noted that the PL configuration information includes at least one of: indication information of a first downlink reference signal (DL RS) resource, a processing rule for multiple path loss amounts, an uplink reference signal received power (RSRP), or an uplink PL.

It is to be noted that the processing rule includes at least one of: taking an equivalent mean of the multiple path loss amounts, taking a weighted average of the multiple path loss amounts, taking a maximum value of the multiple path loss amounts, or taking a minimum value of the plurality of path loss amounts. The indication information of the first DL RS resource may include at least one of: a channel state information reference signal (CSI-RS) resource indication (CRI), a synchronization signal block (S S-block) resource indication, or a tracking reference signal (TRS) resource indication.

In an embodiment of the present application, in the case where one transmission parameter setting set corresponding to the transmission parameter setting set identifier is determined according to the acquired transmission parameter setting set identifier from among the at least one transmission parameter setting set provided in advance, the first transmission parameter set may further include: uplink transmitting resource configuration information for indicating an uplink transmitting resource of the first communication node. The uplink transmitting resource configuration information includes: indication information of an uplink reference signal (UL RS) resource, and indication information of a second downlink reference signal (DL RS) resource.

It is to be noted that the acquisition module 52 is further configured to acquire at least one transmission parameter setting set, where the transmission parameter setting set includes at least one first transmission parameter set.

In an embodiment of the present application, the transmission parameter setting set may further include at least one of: a transmission parameter setting set identifier for identifying the transmission parameter setting set, a cell-specific P0, a waveform-specific maximum power back off value, a configuration parameter related to a physical frame structure parameter, a service-type-specific configuration parameter, or a power headroom report (PHR) configuration parameter.

It is to be noted that the PHR configuration parameter may include at least one of: a PHR switch, a reporting period for a PHR, a minimum reporting interval for the PHR, a PL changing amount threshold, a PHR changing amount threshold, or a type of the PHR.

It is to be noted that the device may further include a third determination module connected to the second determination module 56. The third determination module is configured to determine the uplink transmitting resource of the current transmission according to at least one of the following information: the transmission parameter setting set identifier or the scheduling information.

In an embodiment of the present application, the above device further includes: an acquisition module which is configured to acquire the specified first transmission parameter set; and an update module connected to the acquisition module and the second determination module 56. The update module is configured to update the first transmission parameter set corresponding to the transmission parameter set identifier of the specified first transmission parameter set in the at least one first transmission parameter in the one determined transmission parameter setting set.

It is to be noted that the second determination module 56 is further configured to: for one first transmission parameter set, calculate a PL of an uplink transmission according to the PL configuration information; maintain the closed-loop power adjustment amount locally maintained by the first communication node in the first transmission parameter set; and determine the power of the current uplink transmission according to the P0 configuration information, the path loss amount of the uplink transmission, and the closed-loop power adjustment amount locally maintained by the first communication node.

It is to be noted that maintaining the closed-loop power adjustment amount locally maintained by the first communication node in the first transmission parameter set may be represented as: receiving a transmission power control command; and adjusting the closed-loop power adjustment amount delta locally maintained by the first communication node according to a power adjustment amount carried in the transmission power control command.

It is to be noted that calculating the path loss amount of the uplink transmission according to the path loss configuration information may be represented as: using the uplink transmitting resources to receive reference signal RS on a first downlink reference signal resource and obtaining the path loss value of the reference signal; where the first downlink reference signal resource is a downlink reference signal resource indicated by indication information of the first downlink reference signal resource included in the path loss configuration information; and processing the measured path loss amount according to a processing rule for multiple path loss amounts included in a path loss configuration information, and obtaining the path loss amount of the uplink transmission.

In an embodiment of the present application, the device may further include: a resetting module, which is configured to perform at least one of the following operations: in a case where the first transmission parameter set includes the first indication information, determining whether to reset the closed-loop power adjustment amount locally maintained by the first communication node corresponding to the first transmission parameter set according to the first indication information included in the first transmission parameter set; or determining whether to reset the closed-loop power adjustment amount locally maintained by the first communication node according to a predetermined rule configured by a second communication node for the first communication node. The predetermined rule includes at least one of: every time configuring the first transmission parameter set, resetting the closed-loop power adjustment amount locally maintained by the first communication node corresponding to the first transmission parameter set; every time the target receiving power configuration information in the configured first transmission parameter set changes, resetting the closed-loop power adjustment amount locally maintained by the first communication node corresponding to the first transmission parameter set; every time the path loss configuration information in the configured first transmission parameter set changes, resetting the closed-loop power adjustment amount locally maintained by the first communication node corresponding to the first transmission parameter set; or every time the uplink transmitting resource of the first communication node changes, resetting the closed-loop power adjustment amount locally maintained by the first communication node corresponding to the uplink transmitting resource.

In an embodiment of the present application, the device may further include: a reporting module, which is configured to report a power headroom report to the first communication node in a predetermined reporting manner, where the predetermined reporting manner includes at least one of: separately reporting the power headroom report for each loop of a closed-loop power control, or jointly reporting a joint power headroom report for multiple loops.

It is to be noted that in a case where the predetermined reporting manner is separately reporting the power headroom report for each loop of a closed-loop power control, a trigger condition configured for triggering the reporting of the power headroom report includes at least one of: a path loss amount change of a specified loop exceeds a first predetermined threshold; configuration of the specified loop changes; a first power control parameter of a power control parameter identifier corresponding to the specified loop is reconfigured; the closed-loop power adjustment amount locally maintained by the first communication node which corresponds to the specified loop is reset except due to failure; a difference between the power headroom report and a previously-reported power headroom report is greater than a second predetermined threshold; or the power headroom report satisfies at least one of conditions: the power headroom report is 0, the power headroom report is less than 0, or the power headroom report is less than a third predetermined threshold.

It is to be noted that in a case where the predetermined reporting manner is jointly reporting the joint power headroom report of multiple loops, a trigger condition configured for triggering the reporting of the power headroom report includes at least one of: relative to a previous reporting time of the joint power headroom report of the plurality of loops, a sum of path loss amount changes of all loops of the plurality of loops exceeds a fourth predetermined threshold; configuration of at least one loop of the plurality of loops changes; for at least one loop of the plurality of loops, a first power control parameter of a corresponding power control parameter identifier is reconfigured; for at least one loop of the plurality of loops, the closed-loop power adjustment amount locally maintained by the first communication node is reset except due to failure; a difference between the joint power headroom report and the joint power headroom report previously reported is greater than a fifth predetermined threshold; or the joint power headroom report satisfies at least one of conditions: the joint power headroom report is 0, the joint power headroom report is less than 0, or the joint power headroom report is less than a sixth predetermined threshold.

In an embodiment, the device may, but may not necessarily, be located at a first communication node.

It should be noted that the first communication node may be a terminal, and the second communication node may be a base station, but it is not limited thereto.

The embodiment of the present application further provides a communication node. The communication node includes: a processor, which is configured to execute programs. The programs, when executed, perform the method described in the embodiment two.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Five

A storage medium is further provided by an embodiment of the present application. The storage medium includes a stored program which, when executed, executes any of above-mentioned methods.

In an embodiment, in this embodiment, the storage medium may include, but is not limited to, a U disk, a read-only memory (ROM), a random access memory (RAM), a mobile hard disk, a magnetic disk, an optical disk or another medium capable of storing program codes.

The embodiment of the present application further provides a processor. The processor is configured to execute programs which, when executed, perform the steps of any above-mentioned method.

In one embodiment, for specific examples in this embodiment, reference may be made to the examples described in the above embodiments and optional implementation modes, and the specific examples will not be repeated in this embodiment.

To better understand the embodiments of the present application, the present application will be further described below in conjunction with preferred embodiments.

In a wireless communication system, to reduce power consumption of the sending equipment and interferences caused by the unnecessary high-power transmission to other transmissions, transmission power control needs to be performed on the transmission. Factors such as a communication range size, a maximum sending power and receiving sensitivity of the transmitting device and the receiving device of two communication parties, a modulation and coding scheme and rate of data, an operating frequency band, a bandwidth occupied by the transmission all affect the sending power. Generally, a lower sending power is used in a condition of satisfying a quality requirement for a receiving signal of a receiving end.

In general communication technologies, a communication node 1 sends a reference signal, and a communication node 2 measures a path loss (PL) from the node 1 to the node 2 according to the reference signal. PL is obtained by a sending power of the reference signal of the node 1 and a power of the reference signal received by the node 2. The node 2 assumes that PL of a transmission channel from the node 2 to the node 1 is the same as that of a channel from the node 1 to the node 2, and sets a sending power so that the receiving power of the transmission reaching to the receiving end is able to meet the receiving requirement. Since PL is the result measured unilaterally, this factor belongs to an open-loop part in the sending power. The node 2 analyzes after transmission, power adjustment information for the node 1 is provided according to the received quality, this process belongs to a closed-loop power control.

In the LTE, a link from a base station to a terminal is a downlink, and a link from the terminal to the base station is an uplink. A downlink power is determined by the base station according to a channel measurement result of each scheduled UE and a scheduling algorithm. The uplink power control is manner of an open-loop combined with a closed-loop. Power control factors determined by the UE measurement belong to the open-loop part, and power control factors measured by the base station and fed back to the UE belong to the closed-loop part. In addition, specific quantities related to the transmission, such as a sending rate, an MCS level, a sending bandwidth also affect the power.

A sending power calculation formula of a PUSCH in the LTE is described below, various parameters that affect power is described by using this example. A PUCCH also has similar parameters and mechanisms.

$$P_{PUSCH,c}(i) = \min \left\{ \begin{array}{l} P_{CMAX,c}(i), \\ 10\log_{10}(M_{PUSCH,c}(i)) + P_{0\_PUSCH,c}(j) + \alpha_c(j) \cdot PL_c + \Delta_{TF,c}(i) + f_c(i) \end{array} \right\}$$

The subscript c in the above formula refers to a cell. Each component carrier (CC) that supports a carrier aggregation (CA) function corresponds to one cell. It can be seen from the above formula that each parameter in the power calculation formula is configured or calculated for distinguishing the cell. All descriptions in this application are for 1 CC, so the cell is not specifically mentioned. It is to be noted that all parameters in this application may be extended to multiple CCs, which only needs to independently configure a power-related configuration and calculated parameters for each CC.

A open-loop part of a power $P_{PPUSCH}$ of the uplink transmission PUSCH is determined by a path loss amount PL and a path loss factor $\alpha$ of a target receiving power $P_{O\_PUSCH}$, where the target receiving power divided into cell-level and UE-level parameters, which are determined by the base station and configured for the UE. In the closed-loop part, the base station determines the closed-loop power control adjustment amount according to a difference between the measurement result and the target, and notifies the UE by a transmit power control command (TPC Command, i.e., $\delta_{PUSCH}$ for the PUSCH and $\delta_{PUCCH}$ for the PUCCH in the DCI). The UE maintains a local power adjustment amount f (i), updates it according to the transmit power control command, and uses the above formula to achieve the purpose of closed-loop control power. i denotes a subframe number. $\Delta TF$ is an MCS-related power offset, $P_{CMAX}$ is a maximum power limit of the UE, $M_{PUSCH}$ is the number of resource blocks (RBs) occupied by the PUSCH.

A cell-level target receiving power P0_nominal of the LTE distinguishes the PUSCH (semi-static, dynamic, MSG3) and the PUCCH, which separately correspond to different BLER requirements. A UE-level target receiving power parameter P0_UE_specific is also set for distinguishing the above items. The function is to compensate for systematic deviations, such as a PL estimation error and an error set by an absolute output power.

f (i) is updated in two ways according to the transmit power control command: accumulated and absolute value manners. The absolute value manner is to directly update the UE's local power adjustment amount f (i) with the transmit power control command sent by the base station, and the accumulated manner is to jointly determine the UE's local power adjustment amount f (i) by the transmit power control command sent by the base station and historical values of UE's local power adjustment amount.

It is to be noted that f (i) here represents the UE's local closed-loop power adjustment amount. In the LTE, the UE's local closed-loop power adjustment amount of the PUCCH is recorded as g (i). In this application, f (i) may also be applied to the PUCCH, and a function thereof in power control is similar to that applied to PUSCH.

The 5G technology introduces the beam transmission mode. Both the base station and the UE support multiple beams. At the time of operating in a beam mode, the power calculation needs to consider beam characteristics. This application proposes a multi-beam power control method. Various parameters mentioned in this application are applicable to different channels, such as the PUSCH, a long PUSCH, a short PUSCH, the PUCCH, a long PUCCH, a short PUCCH and a signal SRS. When parameters of a same type are applied to each channel or signal described above, the parameters may be independently configured or configured in a combined manner. Configuring in a combined manner configured means that different channels and signals may share the same value. Which different channels or signals may share the same value is determined in a predefined manner or configured by a base station.

Various beam-related concepts are used in the description of the preferred embodiment of the present application. To facilitate understanding, the following explanations are made.

The sending mode mentioned in the present application includes at least one of: a sending beam, a sending port, a transmitting resource, a reference signal sequence, or a sending precoding matrix (an analog, digital or hybrid manner).

The sending mode mentioned in the present application includes at least one of: a sending beam, a sending port, a transmitting resource, a reference signal sequence, a sending precoding matrix (an analog, digital or hybrid manner), and a receiver algorithm.

The beam may be a resource (such as precoding at the sending end, precoding at the receiving end, an antenna port, an antenna weight vector and an antenna weight matrix), a beam sequence number may be replaced with a resource index for the beam may perform transmission bounding to some time-frequency code resources. The beam may also be a transmission (sending/receiving) mode, and the transmission mode may include a space division multiplexing, a frequency domain/a time domain diversity, etc.

A beam indication means that the sending end may be indicated by a current reference signal and an antenna port, and a quasi co-location (QCL) assumption satisfied by a reference signal (or a base reference signal) and the antenna port fed back by the UE and scanned by the base station.

A receiving beam refers to beams of the receiving end not requiring indication, or beam resources of the receiving end indicated by quasi co-location (QCL) between the current reference signal and antenna port and the reference signal (or base reference signal) and the antenna port fed back by the UE and scanned by the base station.

Channel characteristics, i.e., including physical transmission channel characteristics, such as a horizontal sending azimuth, a vertical sending azimuth, a horizontal receiving azimuth, and a vertical receiving azimuth, etc., and also including characteristics of a radio frequency and a baseband circuit, such as element pattern characteristics, an antenna group, an antenna panel, an antenna subarray, a TXRU, a receiving beam set, an antenna placement, and a baseband time offset, a frequency offset and a phase noise, etc.

The parameters involved in the quasi-co-location (QCL) at least include a Doppler spread, a Doppler shift, a delay spread, an average delay and an average gain; and may also include spatial parameter information, such as an angle of arrival, spatial correlation of the receiving beam, an average delay, correlation of a time-frequency channel response (including phase information).

An uplink and downlink reference signal correlation means that spatial parameter characteristics of the uplink (downlink) reference signal may be determined by the spatial parameter characteristics of the channel experienced by the downlink (uplink) reference signal, which is also known as satisfying the QCL assumption, or satisfying a spatial reciprocity QCL assumption. Specifically, an uplink reference signal sending beam may be determined by the receiving beam corresponding to the downlink reference signal; a downlink reference signal sending beam may be determined by the receiving beam corresponding to the uplink reference signal; an uplink reference signal receiving beam may be determined by the sending beam corresponding to the downlink reference signal; and a downlink reference signal receiving beam may be determined by the sending beam corresponding to the uplink reference signal.

In the embodiment of the present application, for ease of description, the base station and UE (user equipment, user equipment) are used for description, which are not intended to limit the present application. In the implementation processing, the base station and the UE may be replaced with a NodeB (NB), a gNB, and a transmitter receiver point (TRP), an access point (AP), a station, a user, an STA, a relay, a relay and a terminal, etc.

The meaning of the beam (group) in the preferred embodiment of the present application is a beam or a beam group.

Preferred Embodiment One

In a power control parameter and air interface signaling in a multi-beam scenario of NR, at least the following quantities are related to a beam: P0, PL, f (i) and a TPC command. P0 refers to the target receiving power, especially to a non-cell-related part of the target receiving power, which may be UE specific or beam specific. The target receiving power is collectively described as P0 UE specific, this parameter may be for a specific beam, or a beam group, or a beam pair link (BPL), or a BPL group. The BPL group refers to a link pair group between one or more sending beams or one or more receiving beams.

For one transmission, only the beam resource is examined, and clear sending and receiving resources are provided. That is, for one transmission, specific sending and receiving beams (groups) are provided. However, in an actual system, due to the air interface overhead or other reasons, for the uplink transmission, the UE, as a sending end, may not be able to clearly know resources used by a receiving end for receiving, such as a receiving beam. In this case, PL, P0 and f (i) may not be determined because the receiving resources of the receiving end are not clear.

For supporting the UE to know the receiving beam of the uplink transmission and implementing an open-loop plus closed-loop power control mode, the preferred embodiment one of the present application provides a method, which includes the following steps.

1. The base station configures information related to the power control through higher layer signaling or an MAC CE, the information related to the power control is called a power control setting parameter or a first transmission parameter set. In this example, the information is called as a power control set (PC set) parameter. The base station configures one or more sets of PC set parameters for each UE.

Each PC set includes the following contents. The base station may configure, for the UE, at least one of the following information:
    a PC set ID,
    an indication of whether to clear f (i),
    a P0-related configuration, including at least one of:
    a P0 UE specific value,
    a PL-related configuration, including at least one of:
    a DL RS resource: a CRI(s) and/or an S S-block indication and/or a TRS resource indication,
    a combination rule for multiple DL RSs,
    an uplink RSRP/PL value.

The PC set ID is used for identifying the PC set parameters. Each set of PC set parameters is identified by the PC set ID. The PC set configured by the base station for the UE may be configured multiple times. For a same ID, the latter configured is updating of the previously configured. Each PC set ID represents a group of beams at a base station side. When the receiving beam of the base station changes within a group of beam groups, both the base station and the UE consider the PC set parameters to be unchanged. When the receiving beam of the base station changes between different beam groups, both the base station and the UE consider that the PC set parameters may be different, and different beam groups are independently configured.

In a period, the base station may configure one set of PC set parameters for the UE. When all or part of parameters needs to be reconfigured, the base station re-issues relevant parameters to the UE through the higher layer signaling.

In a period, the base station may also configure more than one set of PC set parameters for the UE, and the base station may update different sets of PC set parameters through the higher layer signaling.

If the base station only configures one set of PC set parameters for the UE, the PC set parameters may not include the PC set ID. Whether to carry the PC set ID is determined by the base station.

The indication of whether to clear f (i) refers to whether a quantity related to the PC set ID in the closed-loop power adjustment amount f (i) locally maintained on the UE side is cleared to 0.

The P0 UE specific value refers to an adjustment value of the target receiving power of one receiving beam or a group of receiving beams corresponding to the PC set ID on the base station side. Actual application may embody interference on the receiving beam (group), a system power deviation, an uplink and downlink PL offset, etc.

The DL RS resource includes at least one of the following for indicating a downlink sending beam of the base station: a CRI (s), an SS-block resource indication, or a TRS resource indication. The CRI refers to CSI-RS resource indication, and this information is used for instructing the UE to perform PL measurement by using the specified CSI-RS. The SS-block resource indication refers to a resource indication of a demodulation reference signal (DMRS) of a primary broadcast channel (PBCH) or a secondary synchronization signal (SSS) in a NR-SS, the information indicates the UE to perform the PL measurement with the specified SS-block. The TRS is a tracking reference signal, and the TRS resource indication is to indicate the UE to perform PL measurement with the specified TRS.

If two or all of the CRI, the SS-block resource indication and the TRS resource indication are configured for the UE, whether PL values of the CRI, the SS-block and the TRS are combined is predefined or specified by the base station. If the PL values are combined, whether the combination has the offset is determined in the predefinition or base station specification manner.

The combination rule for multiple DL RSs refers to a combination rule for PL values of multiple DL RSs measured on a downlink receiving beam, including taking an equivalent mean of the multiple PLs, taking a non-equivalent weighted average of the multiple PLs, taking a maximum value of the multiple PLs, or taking a minimum value of the multiple PLs. For a case of the non-equivalent weighted averaging, the combination rule further includes a method for determining a non-equivalent weighting value, and the method includes a manner for directly indicating weight values. For example, three DL RS resources are configured, and PL results obtained by measuring the three DL RS resources are weighted according to the specified proportion. The method further includes a manner for specifying the weights after sorting, such as configuring three DL RS resources, firstly sorting the PL results obtained by measuring the three DL RS resources, and weighting three PL values after sorting according to the specified proportion. The specified proportion may be a pre-configured set of values, or multiple pre-configured sets, and the base station configures one of the multiple pre-configured sets.

The combination rule may also have limitations, such as combining PLs that satisfy the condition in all PL values of the multiple configured DL RSs according to the combination rule. The condition includes that the PL value satisfies a certain threshold requirement. The threshold is specified by standards, or is configured by the base station to the UE as a cell-level/UE-level parameter, or is configured by the base station to the UE as one item in the combination rule of the PC set parameters.

The uplink RSRP/PL value: the base station feeds back the RSRP/PL value of the corresponding uplink transmission link to the UE, so as to correct an error of the UE using a downlink RS measurement value used for the uplink transmission link PL.

Description on the PL

One CRI may be configured in the PL information, and the UE obtains a set of CSI-RSs having a QCL relationship with the CSI-RS indicated by the CRI through the QCL relationship configured by the base station for measuring the PL.

Multiple CRI resources may be configured in the PL information, which is mainly used for solving the problem of poor PL reciprocity. If the reciprocity is good, the information may be not configured or is indicated by using a reserved value, the PL is calculated by the UE according to an actual BPL or an inferred BPL (when the base station does not display a UE RX beam).

Scheduling information should include information used for determining the UE TX beam, such as the CRI and/or the SRI. The SRI is directly used for indicating a TX beam of the UE, and the CRI may be used in two ways: for indicating the RX beam of the base station, or for indirectly indicating the TX beam of the UE. In short, the UE may at least determine the TX beam from the scheduling information.

The scheduling information may also include the PC set ID. If the PC set ID is not included, i.e., only one set is provided for the UE, no indication is required. When the PL information indicated by the PC set ID in the scheduling information has a normal DL RS resource indication, the PL is calculated according to the indicated DL RS. Otherwise, it is a case where the PL reciprocity is available. The UE uses the TX beam or a downlink PL of the BPL of the determined or the referred RX beam to replace the uplink PL.

2. The base station indicates parameters of the PC set for the UE.

The base station indicates the transmitting resource of the uplink transmission, such as the TX beam or the TX beam group, for the UE through the higher layer signaling or physical layer signaling or the MAC CE.

The TX beam (group) may be identified by: the SRS resource indication or the CSI-RS resource indication. The SRS resource indication identifies a UE sending beam (group) used for previously sending the SRS, and a resource indication of the CSI-RS identifies a best receiving beam (group) of the UE corresponding to the previously sent CSI-RS, and takes the best receiving beam (group) as a sending beam (group) of the uplink transmission.

The base station indicates the receiving resource of the uplink transmission, such as the RX beam or the RX beam group, for the UE through the higher layer signaling or physical layer signaling or the MAC CE.

The RX beam (group) may be identified by: the DL RS resource identifier.

The association relationship between the PC set parameter and the TX beam (group) may be one of:
configuring the PC set ID corresponding to the TX beam (group) by the physical layer signaling or the MAC CE;
configuring the association between the PC set ID and the TX beam by the higher layer signaling, only configuring the TX beam (group) by the physical layer signaling or the MAC CE.

The association relationship between the PC set parameter and the TX beam is default. For example, only one set of PC setting parameters is constantly updated and used for all TX beams. Alternatively, the PC set IDs correspond to the TX beams configured through the physical layer signaling in an ascending order.

The physical layer signaling may be DCI information, or other physical layer signaling entities including information related to scheduling.

The PC set ID identifies a set of uplink receiving beams for the UE, which is equivalent to an RX beam group ID. In this manner, the base station hides specific receiving beam information. Generally, the base station may configure the same receiving beam group for the same PC set ID, but the base station may also configure different receive beams for the same PC set ID at different occasions, and implement correspondence with the actual receiving beam by replacing the specific PC set parameters.

When the base station only configures one set of PC set parameters for the UE, PC set ID information may not be included in physical layer information. Whether the PC set ID is included may correspond to different physical layer signaling formats, such as different DCI formats.

3. The base station dynamically sends a transmit power control command by the physical layer signaling TPC command information includes one or more power adjustment amounts, corresponding to one or more TX beams (groups). The number of TX beams (groups) is related to a beam (group) of the independent power control of the current transmission, and the corresponding uplink RX beam (group) is implicitly indicated by the PC set ID.

An example is as follows. It is assumed that the UE sends 2-layer data to the base station by using two sending beams power control of each of which is independently performed, and the base station uses one receiving beam to receive the data. The base station may distinguish qualities of the two sending beams of the UE, i.e., 2-layer data reaching the receiving beam of the base station, then the base station transmits two closed-loop power adjustment amounts (which is set to delta1 and delta2) in the TPC command corresponding to two sending beams of the UE. The UE applies these two closed-loop power adjustment amounts to f (i) corresponding to the two sending beams of the UE respectively. The base station may also use multiple receiving beams to receive the data at the same time. In this case, the multiple receiving beams of the base station are a receiving beam group. The base station comprehensively considers the receiving quality of the multiple beams in the receiving beam group, and sends one closed-loop power adjustment amount for each UE's sending beam. The UE's processing to f (i) is the same as that of in the case where the base station receiving the data with one beam. That is, details of the base station using multiple receiving beams to receive the date at the same time are transparent to closed-loop power control process of the UE. f (i) corresponding to the closed-loop power adjustment amount is an amount corresponding to the PC set ID currently transmitted.

4. The UE calculates a power of the uplink transmission (PUSCH/PUCCH/SRS) using the following method.

The UE receives higher layer information and obtains one or more sets of PC set parameters.

The UE determines the TX beam of the current transmission and the PC set ID corresponding to the current transmission according to the physical layer signaling or scheduling information of the MAC CE.

The UE sets a P0 UE specific value and a PL parameter for each PC set ID in PC set parameters.

The UE maintains f (i) for each pair of TX beam (group) and PC set ID.

If each of multiple TX beams of the UE can be subjected to independent power control, i.e., the base station sends the TPC command for different TX beams, the UE maintains f (i) for each pair of (TX beam & PC set ID).

Otherwise, if multiple TX beams are subjected to group-based power control, i.e., the base station sends the TPC command in units of the TX beam group of the UE, the UE maintains f (i) for each pair of (TX beam & PC set ID).

The UE receives the transmit power control command and applies the command to the corresponding f (i) of (TX beam (group) & PC set ID), and adopts an accumulated or non-accumulated manner according to configuration made by the base station.

After the UE receives the PC set, if P0 related information is included, the P0 UE specific value corresponding to the PC set ID is updated and a possible clearing operation is performed on f (i) according to a rule indicated by the base station.

After the UE receives the PC set, if P0 related information is included, parameter configuration of PL calculation is updated and the possible clearing operation is performed on f (i) according to the rule indicated by the base station.

Possible combination rules and DL RS resources required for PL calculation are obtained from the PC set parameters of the higher layer configuration according to the PC set ID, and the TX beam of the uplink transmission determined by the physical layer information is taken as the PL for receiving the DL RS resource by the receiving beam and the PL for calculating uplink transmission according to the possible combination rule.

PL, P0, f (i) are used for calculating the power of this uplink transmission.

It is assumed that the sending beam of the base station and the UE corresponds to the receiving beam of the base station and the UE, i.e., the sending beam and the receiving beam are the same in beam width and quantity.

Figure 6:
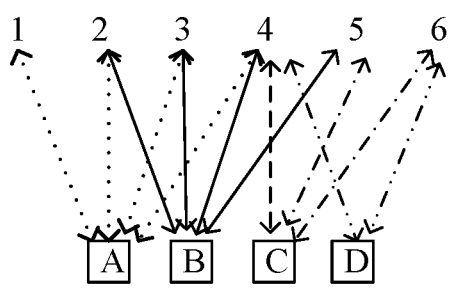
FIG. 6 is a schematic diagram of beams of a base station and beams of a UE provided by a preferred embodiment one of the present application.

FIG. 6 is a schematic diagram of beams of a base station and beams of a UE provided by a preferred embodiment one of the present application. As shown in FIG. 6, to simplify the description, the beams of the base station are denoted by numerals, and the beams of the UE are denoted by letters.

After measurement in a beam management stage, the base station learns about the beam pair link between the base station and the UE, and uses this to schedule uplink transmission pair resources for the UE. For a certain period of transmission, the base station indicates the UE to perform transmission by using a beam B. One or more best receiving beams are selected by the base station from all receiving beams, as shown in FIG. 6, an optimal set of B→2, B→3, B→4, B→5 may be selected. Then the base station may choose one or more beams in this optimal set.

If the PL uplink and downlink reciprocity is available, and the base station indicates a receiving beam such as a beam 3, then the UE measures the channel by using a DL RS sent by the base station through the beam 3, and uses it as a PL for the power calculation of the uplink transmission link B→3. In this case, the base station may not need to configure PL related parameters for the UE.

If the PL uplink and downlink reciprocity is not available, the PC set configured by base station for the UE carries the PL related parameters. For using the beam B in this period of transmission, the PL related parameter included in the PC set sent by the base station to the UE specifies that the UE uses the DL RSs of beams 2, 3, 4 and 5 of the base station to measure the downlink PL, and then the UE obtains the PL for uplink transmission according to the combination rule. At this time, the base station may or may notify the UE of the specific receiving beam. For the PL calculation, the UE does not need to know the specific receiving beam.

If it is necessary for the UE to frequently switch the sending beam, such as to implement a transmit diversity function, the base station may configure multiple sets of PC sets for the UE. As shown in FIG. 6, the PL related parameters in a PC set ID 1 indicate the DL RSs sent by the base station through the beams 2, 3, 4 and 5, and the PL related parameters in the PC set ID 2 indicate the DL RSs sent by the base station through the beams 4 and 6. When the base station instructs the UE to perform transmission by using the beam B, the base station carries the PC set ID 1, and when the base station instructs the UE to perform transmission by using a beam D, the base station carries the PC set 2.

If there is no need to frequently switch the sending beam, only one set of PC set parameters may be configured, for example, the PL related parameter is configured to indicate that the DL RS resource sent by the beams 2, 3, 4 and 5 is to be used. If the UE needs to switch to the beam A, the base station resends the PC set parameter, and configures the PL related parameter to indicate that the DL RS resource sent by the beams 1, 2, 3 and 4 is to be used.

For a P0 parameter, a UE specific part is independently configured for the UE, which may reflect an interference level suffered by the base station and a power adjustment deviation of the UE. In a multi-beam scenario, interferences on different receiving beams of the base station are different, so the configuration needs to be based on the receiving beams of the base station. According to uplink and downlink beam measurement results, the base station selects some possible receiving beams for the UE, and determines a UE specific P0 according to these beams, which may be independently configured by the receiving beams of the base station or be independently configured by the receiving beams of the base station by groups. This value is used as an initial calculation value of the power control, and the accuracy of the configuration according to beams is not necessary, so it is more feasible to configure according to the receiving beam group. An error between the configured value and the actual value is compensated by the closed-loop power control process.

As shown in FIG. 6, the base station configures the PC set parameters for the UE. The P0 related parameter is configured to be 10 dB, the corresponding PC set ID is configured to be 1, and the P0 related parameter of the PC set ID 2 is configured to be 15 dB.

The base station adjusts the UE's local closed-loop power adjustment amount f (i) through the TPC command, thereby affecting the sending power. In a beam scenario, switching the beam at the receiving or transmitting end may cause the adjustment range of the power adjustment amount to be larger than that of the traditional LTE. This problem may be solved by increasing the number of bits of the TPC command. However, this problem is not applicable to all scenarios, i.e., not all UEs need to increase overhead of the TPC command. The above problem can be solved by solutions described below.

Solution 1: an extended TPC command is provided, and the extended TPC command has more bits than a normal TPC command.

The number of bits of the extended TPC command is a standard predefined value. For example, the extended TPC command may have 1 to 2 more bits than the normal TPC command, and the number of bits of the extended TPC command may be 3 or 4, or the number of bits may be configured by the base station through the higher layer signaling.

The base station uses the higher layer signaling to configure whether the UE uses the normal TPC command or the extended TPC command. Or, the base station uses different DCI formats to carry TPC commands of different lengths. The DCI formats are blindly detected by the UE or configured by the base station through the higher layer signaling.

Solution 2: the P0 parameter is resent to solve the problem that the TPC command is unable to indicate the power adjustment amount due to the overhead limitation.

In the application of the actual system, the base station may need to change the receiving beam due to the comprehensive scheduling, but the UE is not explicitly notified. In this case, the base station needs to notify the UE of that the adjustment amount of the sending power is relatively large, which exceeds a range of the normal TPC command. Taking the case where the TPC command of the LTE is the normal TPC command as an example, the bit overhead is 2 bits, and an indicated range is −1~3 dB for an accumulated adjustment and −4~4 dB for an absolute adjustment. The accumulated and absolute adjustments are semi-statically configured, and cannot be dynamically changed. An absolute adjustment range is relatively large, and an adjustment granularity is relatively coarse, while the accumulated adjustment range is relatively small, and the adjustment granularity is relatively fine. It is assumed that the accumulated adjustment is adopted, the adjustment range of the normal TPC command is −1~3 dB, and the base station needs to switch the receiving beam, the required adjustment power amount is −6 dB, which exceeds the adjustment range of the normal TPC command. The base station resends the PC setting parameter, including a new P0. The following method is adopted for processing.

The base station ensures that (the new P0 value−a P0 value sent last time+a new normal TPC command) is the required target power adjustment amount. Here the target power adjustment amount is −6 dB, then the base station may choose to indicate a part of the target power adjustment amount in the TCP command, and the remaining part is carried in the new P0. A specific allocation rule depends on the base station. The normal TPC command may be used to indicate a maximum absolute value of a positive or negative adjustment amount in order to ensure the P0 value to be as stable as possible, the rest may be indicated by a difference between the new P0 and the P0 sent last time. In this case, the base station does not need to clear f (i) in the PC set parameter for sending the P0.

If the resending of P0 by the base station is not for solving the problem of an insufficient indication range of the TPC command, but for changing a new set of receiving beams, in a case where only one set of PC set parameters is provided, the base station may need to clear f (i).

In the case of multiple sets of PC set parameters, if the corresponding f (i) is not maintained for a long time, the UE may set the local closed-loop power adjustment amount to be 0. This time length is predefined or configured by the base station.

The base station may set the corresponding f (i) of the corresponding PC set ID to be zero as needed.

The advantage of setting multiple sets of PC set parameters is that only the PC set ID is used for indexing, which facilitates switching among multiple sets of parameters. The overhead is small compared with reconfiguring the full set of parameters each time. In addition, the closed-loop power control parameters related to each set of parameters may also use historical values.

Preferred Embodiment Two

A closed-loop power control in a power control of an uplink transmission needs continuity, i.e., the UE obtains feedback of an adjusted power from the base station according to a power sent previously to adjust a sending power of a new transmission. In a NR beam scenario, beam switching is needed during the communication process of the base station and the UE. Strictly speaking, the closed-loop power control process is for sending and receiving a beam pair link. A closed-loop power control process needs to be performed again when a sending or receiving beam is changed. But in fact, for some beams with similar characteristics, parameters of the closed-loop power control may be shared and inherited.

By configuring the same PC set ID for different receiving beams or receiving beam groups, the base station may set whether a closed-loop power control amount is shared. If f (i) is configured to be cleared, f (i) does not have inheritance for a beam combination before configuration and a beam combination after configuration. If f (i) is not configured to be cleared, f (i) has inheritance for the beam combination before configuration and the beam combination after configuration has inheritance. Only the PC set ID may be visible to the UE. Whether the base station switch the beams may be transparent to the UE.

In this application, P0, PL and f (i) are associated by the PC set ID. An actual base station beam or base station beam group corresponding to the PC set ID is freely selected by the base station. The base station may correspond to the TRP and the PC set ID in different ways. For example, different TRPs are assigned to different groups to correspond to different PC set IDs. Or one TRP may be divided into multiple groups, or multiple TRPs may be set into one group.

For a scenario which requires frequent beam switching, i.e., when the beam is switched to an original beam configuration, the closed-loop power control is expected to inherit a value of the original beam configuration, the base station may configure multiple sets of PC set parameters and different PC set IDs for the UE. The UE separately maintains the local closed-loop power adjustment amount f (i) for multiple PC set IDs, and determines whether to clear f (i) according to indication information in the PC set.

The base station provides scheduling information to the UE, such as a DCI, which can indicate the receiving beam information. If the PL has reciprocity, the UE can determine a downlink BPL link for calculating the PL according to this information. Receiving beam switching by the base station may be reflected by changing of the PL. If the DCI does not explicitly indicate information of the receiving beam, or the PL does not have reciprocity, the UE calculates the PL according to configuration of PL related information in the PC set parameter.

From a perspective of the base station, whether to clear f (i) is configured by the base station to the PC set ID, which may be independent of the configuration of the PL, or have a certain relationship with the configuration of the PL. In the determination of whether to clear f (i) by the base station, actual changing of the beam pair is also considered. f (i) here is a closed-loop power adjustment amount maintained locally maintained by the UE, and is related to the PC set ID.

From a perspective of the UE, f (i) is different for each sending beam or sending beam group. It is assumed that the base station configures two sets of PC set parameters, and the corresponding PC set IDs are 1 and 2. The UE has 4 beams. As shown in FIG. 6, beams A and B are in one group, and a beam C is a group independently.

When the base station configures an uplink resource to instruct the UE to perform transmission by using the beam C and indicates that the PC set ID is 1, the UE maintains the local closed-loop power adjustment amount f (i) 1 for the beam C→PC set ID 1, an initial value is 0. When the sending beam remains unchanged and the PC set ID remains unchanged, the value is updated according to a TPC command.

When the UE is instructed to switch the sending beam to the beam B, the UE maintains the local closed-loop power adjustment amount f (i)_2 for the beam A/B→PC set ID 1, an initial value is 0. When the sending beam remains unchanged and the PC set ID remains unchanged, the value is updated according to the TPC command.

When the UE is instructed to switch the sending beam i to the beam A, the UE still maintains the local closed-loop power adjustment amount f (i)_2 for the beam A/B→PC set ID 1, and updates the value according to the TPC command.

When the UE is instructed to switch the sending beam to the beam C, the UE re-enables f (i)_1 corresponding to the beam C and updates the value according to the TPC command.

When the base station configures an uplink resource to instruct the UE to perform transmission by using the beam C and indicates that the PC set ID is 2, the UE maintains the local closed-loop power adjustment amount f (i)_3 for the beam C→PC set ID 2, and an initial value is 0. When the sending beam remains unchanged and the PC set ID remains unchanged, the value is updated according to the TPC command.

When it is indicated that the sending beam of the UE is the beam C but the PC set ID is 1, the UE maintains the local closed-loop power adjustment amount f (i)_1 for the beam C→PC set ID 1, and updates the value according to the TPC command.

The base station may clear f (i) corresponding to a current sending beam (pair) of the UE by configuring the PC set parameters as needed.

The above description is that the base station sets whether to clear f (i) for each PC set parameter. In addition to this method, the base station may also configure a UE level indication of whether to clear f (i) for the UE. If the UE is configured with multiple sets of PC set parameters, the UE level indication is valid for all PC set IDs of the UE.

Whether to clear f (i) may be determined by using a default rule, such as a PL set and/or P0 reconfiguration, and then the corresponding f (i) is cleared. In this case, it does not need to configure indication of whether to clear f (i) in the PC set parameter.

The base station may further enable/disable the above-mentioned default rule through indication information. When the default rule is enabled, it does not need to configure whether to clear f (i) in the PC set parameter, the PL set and/or P0 is reconfigured, and f (i) is cleared. When the default rule is disabled, the PC set parameter may include whether to clear f (i).

Preferred Embodiment Three

The method of this application may support the following application scenario in which one set of PC set parameters corresponds to one f (i) of a UE.

In this scenario, a base station configures the PC set parameters to the UE through higher layer signaling.

The PC set parameters include at least one of:
an indication of whether to clear f (i);
a P0-related configuration, including at least one of: a P0 UE specific value;
a PL-related configuration, including at least one of: a DL RS resource, CRI(s) and/or an SS-block indication;
a combination rule for multiple DL RSs; or
an uplink RSRP/PL value.

Specific meanings of the above items are described the embodiment one.

The base station indicates a transmitting resource of an uplink transmission, such as a TX beam or a TX beam group, for the UE through physical layer signaling or an MAC CE.

The base station indicates a receiving resource of the uplink transmission, such as an RX beam or an RX beam group, for the UE through the physical layer signaling or the MAC CE.

The base station sends a TPC command (denoted by "delta") for the UE through the MAC CE or the physical layer signaling.

The UE calculates a sending power for the transmitting resource, such as a sending beam (group), of the uplink transmission indicated by the base station.

The P0 UE specific value required for power calculation uses a latest value of a P0 UE specific parameter in PC setting parameters configured by the base station for the UE.

The PL is calculated according to the latest PL related setting in the PC set parameters configured by the base station for the UE. The specific method is described in the embodiment one.

The UE locally maintains a closed-loop power adjustment amount f (i) and updates f (i) according to the delta sent by the base station. The specific method is described in the embodiment one.

The UE uses the above P0 UE specific value, PL and f (i) to calculate the sending power of this uplink transmission.

Through the above method, the base station may implement an uplink transmission power control in a multi-beam mode. Along with the channel changing, the base station determines whether to change the sending beam (group) and/or receiving beam (group) of the uplink transmission.

If the sending beam (group) is changed, the base station notifies the UE through the physical layer signaling or the MAC CE. At the same time, the base station may determine whether to reconfigure the PC set parameters. If the PC set is reconfigured, the base station may also determine whether to clear f (i). The reconfigured PC set parameters may only include part of parameters, such as only including the P0 related setting, or only including PL related to setting.

If the receiving beam (group) changes, the base station may notify the UE through the physical layer signaling or the MAC CE or may not notify the UE. At the same time, the base station may determine whether to reconfigure the PC set parameters. If the PC set is reconfigured, the base station may also determine whether to clear f (i). The Reconfigured PC set parameters may only include part of parameters.

The UE determines whether to clear the local f (i) according to the latest PC set parameters and adjusts f (i) according to the TPC command sent by the base station.

TABLE 1

| time | t0 | t1 | t2 | t3 |
|---|---|---|---|---|
| PC setting | PC setting 1 | | PC setting 2 | |
| TX beam (group) | 1 | 2 | 3 | 2 |
| delta | delta | delta | delta | delta |
| UE local f(i) | f(i) | f(i) | f(i) | f(i) |

As shown in Table 1, a loop of the closed-loop power adjustment is between the base station and the UE.

At a time t0, the base station configures one set of PC set parameters. At a current time or some subsequent time, the transmitting resource, including a TX beam (group) 1, of the uplink transmission is carried in the physical layer signaling or the MAC CE. The UE establishes a local closed-loop power adjustment amount f (i). The base station sends the TPC command for the TX beam (group) 1, which is assumed to be delta here. After receiving the TPC command, the UE updates f (i).

At a time t1, the base station changes a TX beam (group) to 2, and does not reconfigure the PC set parameters. In this case, the UE may execute the following operations.

The UE continues to use the historical value of f (i) and updates f (i) at this time with a new delta value.

Alternatively, whether to clear f (i) is determined according to a default rule or a clearing rule of f (i) configured by the base station to the UE. If the rule is to switch the sending beam, f (i) is cleared and the historical values of f (i) are cleared; otherwise, the historical values are continuously used.

At a time t2, the base station updates the PC set parameter to be the PC set 2. At the current time or some subsequent time, the transmitting resource, including a TX beam (group) 3, of the uplink transmission is carried in the physical layer signaling or the MAC CE. The UE operates f (i) according to the indication of whether to clear f (i) in the PC set 2. Alternatively, if the indication of whether to clear f (i) is not in the PC set 2, the UE may determine whether to clear f (i) according to the default rule or the clearing rule off (i) configured by the base station to the UE.

At a time t3, the base station changes the transmitting resource to the TX beam (group) 2, and the operation of the UE is similar to that at the time t1.

UE maintains a local closed-loop power adjustment amount f (i) in the above description. When a TX beam (group) supports an MIMO multi-flow transmission, and the corresponding multiple streams support an independent power control, the UE should maintain, for each loop, f (i) of the number of MIMO streams in the corresponding TX beam (group). The above MIMO multi-flow transmission refers to a multi-transmit block (TB) transmission. When a TX beam (group) supports an MIMO multi-layer transmission, and supports an independent hierarchical power control, the UE should maintain, for each PC setting loop, f (i) of the number of MIMO streams in the corresponding TX beam (group).

Preferred Embodiment Four

The preferred embodiment of this application may support the following application scenario in which: N sets of PC set parameters correspond to N TX beams (groups) sent at the same time and N f (i)s of the UE. N is an integer greater than or equal to 1.

The base station and the UE at most support N closed-loop power adjustment loops. Each loop corresponds to a PC set ID and a UE's local closed-loop power adjustment amount f (i). Correspondingly, a TPC command sent by the base station for the UE includes at most N Delta adjustment amounts corresponding to N loops respectively. A loop corresponds to a PC set ID, but the PC set parameters may be determined by the base station as needed, i.e., a same PC set ID may be configured with PC set parameters having different contents. A loop may correspond to a different TX beam (group) at a different time, which is configured by the base station as needed. The concept of loop is used here for the convenience of description. In an actual system, a loop number in this embodiment may be replaced by the PC set ID.

In this scenario, the base station configures N sets of PC set parameters to the UE through higher layer signaling.

Each set of PC set parameters includes at least one of:
a PC set ID;
an indication of whether to clear f (i);
a P0-related configuration, including at least one of: a P0 UE specific value;
a PL-related configuration, including at least one of: a DL RS resource, CRI(s) and/or an SS-block indication;
a combination rule for multiple DL RSs; or
an uplink RSRP/PL value.

Specific meanings of the above items are described the embodiment one.

The base station indicates a transmitting resource of an uplink transmission, such as a TX beam group, for the UE by the physical layer signaling. In this scenario, N TX beams (groups) need to be indicated, and these N TX beams (groups) are sent at the same time.

The base station indicates a receiving resource of the uplink transmission, such as RX beams (groups), for the UE by the physical layer signaling. In this scenario, the base station may indicate the corresponding RX beams (groups) for N TX beams (groups) respectively. A number of the corresponding RX beams (groups) may be equal to, less than or greater than N.

The base station supports that N PC set IDs respectively correspond to N TX beams (groups), and the UE needs to maintain N local closed-loop power adjustment amounts f (i)_1, . . . f (i) N for N combinations of the PC set ID and the TX beam (group). Each f (i)_n (n ranges from 1 to N) corresponds to an independent PC set parameter and is updated according to N deltas in the TPC command of the base station.

The base station and the UE support relationship configuration of at most N PC set IDs and TX beams (groups). The uplink transmission scheduled at a certain time may not use all N TX beams (group), which may also be supported.

TABLE 2

| time | t0 | | t1 | | t2 | t3 |
|---|---|---|---|---|---|---|
| PC setting | PC setting 1 | (ID 1) | | | PC setting 3 | (ID 1) |
| | PC setting 2 | (ID 2) | | | PC setting 4 | (ID 2) |
| Relationship between PC setting and TX beam | ID 1-beam 1 ID 2-beam 2 | (loop 1) (loop 2) | ID2-beam 3 | (loop 2) | | |
| TX beam (group) | 1 2 | | 1 3 | | 1 3 | 3 |
| delta | delta 1 delta 2 | | delta 1 delta 2 | | delta 1 delta 2 | delta 1 |
| UE local f(i) | f(i)_loop1 f(i)_loop2 | | f(i)_loop1 f(i)_loop2 | | f(i)_loop1 f(i)_loop2 | f(i)_loop2 |

The association relationship between the PC set parameter and the TX beam (group) is described in the related description of the embodiment one.

The base station sends a TPC command delta for the UE through the physical layer signaling. Delta includes N power adjustment commands, respectively corresponding to N TX beams (groups).

The UE calculates the sending power for each of the N transmitting resources, such as N sending beams (groups), of the uplink transmission indicated by the base station. According to the above description, the PC set parameter corresponding to each beam (group) is determined. Then the sending power for each sending beam (group) of the UE is calculated according to the method described in the embodiment three.

Through the above method, the base station may implement the uplink transmission power control in a multi-beam mode, and support simultaneous uplink transmission of multiple beams and implement the independent power control. Along with the channel changing, the base station decides whether to change the sending beam (group) and/or receiving beam (group) of the uplink transmission. Since N sets of PC set parameters are in parallel, the base station may independently update the configuration of each set of parameters. At different times, the base station determines whether PC sets corresponding to a same PC set ID correspond to a same receiving beam (group). That is, it is supported that the same PC set ID corresponds to different receiving beams (groups) of the base station.

The base station updates the correspondence between the PC set parameters and the TX beams according to the channel changing. N PC set IDs correspond to N TX beams (groups) respectively. It is supported that N PC set IDs respectively correspond to N TX beams (groups). It is also supported that part of N different PC set IDs correspond to the same PC set parameter, or part of N TX beams (groups) corresponding to N PC set IDs are same.

As shown in Table 2, N=2, i.e., the base station configures a correspondence between at most 2 PC set IDs and 2 TX beams (groups). At a time t0, the base station configures two sets of PC set parameters, which respectively correspond to a PC set ID 1 and a PC set ID 2. The relationship between the PC sets and the TX beams (groups) configured by the base station is: the PC set ID 1 is related to a TX beam (group) 1 (represented by loop1), and the PC set 2 is related to a TX beam (group) 2 (represented by loop2). A transmitting resource, including the TX beams (groups) 1 and 2, of an uplink transmission is carried in uplink scheduling information at a current time or a subsequent time. UE establishes local closed-loop power adjustment amounts f (i)_loop1 and f (i)_loop2 for loop 1 and loop 2 respectively. The base station sends the TPC commands for the TX beams (groups) 1 and 2, which are assumed to be delta 1 and delta 2 here. After receiving the TPC commands, the UE updates f (i)_loop1 and f (i)_loop2 respectively.

At a time t1, the base station changes a scheduling resource and adjusts the TX beam (group) 2 of the original loop 2 to the TX beam (group) 3. In this case, the base station considers that the original f (i)_loop2 may still be used, so PC set parameters related to the PC set ID 2 are not sent, and f (i) of loop 2 is cleared. The UE takes a TX beam (group) 3 as the transmitting resource of loop 2, and calculates a sending power for the transmitting resource.

At a time t2, the base station needs to update the PC set parameters of the PC set IDs 1 and 2. As shown in Table 2, the contents are updated to be PC set 3 and PC set 4 respectively. The reason for updating may be that the base station decides to switch the RX beam (group) or change the configuration of the PL, or the reason is just for configuring whether to clear the corresponding f (i). After this time, no new configuration about the relationship between the PC set and the TX beam (group), so the original relationship configuration is still used by the UE.

At a time t3, the base station determines to schedule only one TX beam (group) 3, and then the UE determines that the PC set ID 2 is associated with the TX beam (group) 3. The base station also sends, in the TPC command, an adjustment command delta 1 only for the TX beam (group). The UE updates f (i) of loop2.

Preferred Embodiment Five

The preferred embodiment of this application may support the following application scenario.

A PC set ID and a TX beam (group) identifier determine a loop. A UE maintains an independent local closed-loop power adjustment amount f (i) for each loop.

Multiple loops may work at the same time, and the base station may configure different sending and/or receiving resources, such as sending/receiving beams (groups), for the UE's uplink transmission at different times. Due to scheduling reasons, beam switching may be frequent. In this scenario, when switching to the previous sending beam (group) or receiving beam (group), the corresponding f (i) may also be used, and not changed by closed-loop power adjustment commands of other sending and receiving beams (groups).

In this scenario, the base station configures multiple sets of PC set parameters to the UE through higher layer signaling. Contents of each set of PC set parameters are the same as that in the preferred embodiment four.

The base station indicates a transmitting resource of an uplink transmission for the UE through the physical layer signaling. The base station may indicate a receiving resource of the uplink transmission for the UE through the physical layer signaling. Specific details are the same as those in the embodiment four.

The correspondence relationship between the PC set parameter and the TX beam (group) may be configured in several ways, which may be the same as those in the preferred embodiment four.

The UE calculates the sending power for each of multiple transmitting resources, such as sending beams (groups), of the uplink transmission indicated by the base station. According to the above description, the PC set parameter corresponding to each beam (group) is determined. Then the sending power for each sending beam (group) of the UE is calculated according to the method described in the preferred embodiment three.

to a TX beam (group) 1 (represented by loop1), and the PC set 2 is related to a TX beam (group) 2 (represented by loop2). A transmitting resource, including the TX beams (groups) 1 and 2, of an uplink transmission is carried in uplink scheduling information at a current time or a subsequent time. UE establishes local closed-loop power adjustment amounts f (i) loop1 and f (i) loop2 for loop 1 and loop 2 respectively. The base station sends the TPC commands for the TX beams (groups) 1 and 2, which are assumed to be delta 1 and delta 2 here. After receiving the TPC commands, the UE updates f (i)_loop1 and f (i)_loop2 respectively.

At a time t1, the base station configures two sets of PC set parameters, which respectively correspond to a PC set ID 3 and a PC set ID 4. The relationship between the PC set and the TX beam (group) configured by the base station is: the PC set ID 3 is related to a TX beam (group) 3 (represented by loop3), and the PC set 4 is related to a TX beam (group) 4 (represented by loop4). A transmitting resource, including the TX beams (groups) 3 and 4, of an uplink transmission is carried in uplink scheduling information at a current time or a subsequent time. UE establishes local closed-loop power adjustment amounts f (i) loop3 and f (i) loop4 for loop 3 and loop 4 respectively. The base station sends the TPC commands for the TX beams (groups) 3 and 4, which are assumed to be delta 1 and delta 2 here. After receiving the TPC commands, the UE updates f (i)_loop 3 and f (i)_loop 4 respectively.

At a time t2, the base station needs to update the PC set parameters of the PC set IDs 1 and 2. As shown in Table 3, the contents are updated to be PC set 5 and PC set 6 respectively. The reason for updating may be that the base station decides to switch the RX beam (group) or change the configuration of the PL, or the reason is just for configuring whether to clear the corresponding f (i). The base station also updates the correspondence between the PC set ID and the TX beam (group), where the PC set ID 1 corresponds to a TX beam (group) 5 (represented by loop5). A transmitting resource, including the TX beams (groups) 5 and 2, of an uplink transmission is carried in uplink scheduling information at a current time or a subsequent time. UE establishes a local closed-loop power adjustment amount f (i) loop 5 for a loop 5. The base station sends the TPC commands for the TX beams (groups) 5 and 2, which are assumed to be delta

TABLE 3

| time | t0 | | t1 | | t2 | t3 |
|---|---|---|---|---|---|---|
| PC setting | PC setting 1 | (ID 1) | | | PC setting 5 (ID 1) | |
| | PC setting 2 | (ID 2) | | | PC setting 6 (ID 2) | |
| Relationship between PC setting and TX beam | ID 1-beam 1 | (loop 1) | | | ID1-beam 5 (loop 5) | |
| | ID 2-beam 2 | (loop 2) | | | | |
| | | | ID3-beam 3 | (loop 3) | | |
| | | | ID4-beam 4 | (loop 4) | | |
| TX beam (group) | 1 | | 3 | | 5 | 3 |
| | 2 | | 4 | | 2 | 4 |
| delta | delta 1 | | delta 1 | | delta 1 | delta 1 |
| | delta 2 | | delta 2 | | delta 2 | delta 2 |
| UE local f(i) | f(i)_loop1 | | | | | |
| | f(i)_loop2 | | | | f(i)_loop2 | |
| | | | f(i)_loop3 | | | f(i)_loop3 |
| | | | f(i)_loop4 | | | f(i)_loop4 |
| | | | | | f(i)_loop5 | |

As shown in table 3, at a time to, the base station configures two sets of PC set parameters, which respectively correspond to a PC set ID 1 and a PC set ID 2. The relationship between the PC set and the TX beam (group) configured by the base station is: the PC set ID 1 is related 1 and delta 2 here. After receiving the TPC commands, the UE updates f (i) loop 5 and f (i) loop 2 respectively.

At a time t3, the base station has not updated the PC set parameters, nor configured the relationship between the PC set ID and the TX beam (group). The uplink scheduling information indicates that the transmitting resource is TX beams (groups) 3 and 4, and the associated PC set IDs are respectively 3 and 4. The base station sends the TPC commands for the TX beams (groups) 3 and 4, which are assumed to be delta 1 and delta 2 here. After receiving the TPC commands, the UE updates f (i) loop 3 and f (i) loop 4 respectively.

Preferred Embodiment Six

A base station configures at least one closed-loop power control loop for a UE, where each loop includes at least a PC set ID and a TX beam (group) identifier. The UE maintains an independent local closed-loop power adjustment amount f (i) for each loop.

The base station configures a loop ID for each loop to identify the loop.

The closed-loop power control loop may be configured through higher layer signaling or an MAC CE or physical layer signaling.

When the base station decides to switch a beam (group) of an uplink transmission for the UE, it is assumed that only a sending beam is switched and the corresponding PC set configuration on the base station side is not changed, i.e., the PC set ID remains unchanged. The base station has two modes. The first mode is that an additional loop is configured, including an original PC set ID and a new TX beam (group) ID. The Second mode is updating original loop configuration and updating the TX beam (group) ID to a new one. A characteristic of the first mode is that when the TX beam (group) is changed, different TX beams (groups) have independent closed-loop power adjustment parameters. For a scenario in which the sending beam (group) is switched, switching to the original TX beam (group) may also use the closed-loop power adjustment parameters of this configuration. A characteristic of the second mode is that only the TX beam (group) is changed without adding new loop configuration, and the TX beam (group) before the change and the TX beam (group) after the change may share historical records off (i).

When the base station determines to switch the beam (group) for the uplink transmission for the UE, assuming that only the receiving beam (group) is switched without changing the TX beam (group) of the UE, the base station has the following modes. The first mode includes reconfiguring a set of PC set parameters, identifying the set with a new PC set ID; adding a new loop, identifying the loop with a new loop ID; and configuring an association relationship between the new PC set ID and the original TX beam (group). The second mode includes keeping configuration of the loop unchanged, only updating contents of the PC set parameters corresponding to the PC set ID. The third mode includes not requiring special configuration or notification and still using the PC set parameters corresponding to the original PC set ID. A characteristic of the first mode is that different receiving beams (groups) correspond to independent closed-loop power adjustment parameters. For a scenario in which the receiving beam (group) is frequently switched, switching to the original RX beam (group) may also use the closed-loop power adjustment parameters of this configuration. A characteristic of the second mode is that different receiving beams (groups) possibly share historical record values of f (i) of the RX beam (group) before and after the change. A characteristic of the third mode is that different receiving beams (groups) can share the historical record values of f (i) of the RX beam (group) before and after the change.

When the base station determines to switch the beam (group) of the uplink transmission for the UE, it is assumed that both the sending and receiving beams need to be changed. The base station has the following modes. The first mode is to add new loop configuration, including a new TX beam (group) and a new receiving beam (group). The second mode is to update the original loop configuration, including the PC set IDs corresponding to the new TX beam (group) and new receiving beam (group). The PC set ID corresponding to the new receiving beam (group) may be configured or newly configured. A characteristic of the first mode is that the closed-loop power parameter is maintained for the beam configuration before and the beam configuration after the change respectively, and when switching to the original sending and receiving beam (group) configuration, the closed-loop power parameter can use the historical values. A characteristic of the second mode is that the beam configuration before change and the beam configuration after the change possibly share the closed-loop power parameters.

Preferred Embodiment Seven

In all the above preferred embodiments, the UE maintains f (i) for each loop. For a loop that has not been updated for a long time, an expiration mechanism should exist, i.e., this loop's f (i) is cleared or configured to an invalid value. The expiration mechanism of the loop may adopt at least one of the following manners.

The base station configures a time amount for the UE. If the UE does not update the loop's f (i) according to the operation indicated by the base station within this time amount, the UE clears the loop's f (i) or marks it as the invalid value. The updating also includes a clearing operation, which may be triggered by whether to clear the f (i) in the PC set sent by the base station, or be triggered by a condition configured by the base station for the UE on clearing f (i).

The base station controls an expiration time of each loop. Once a loop has not been updated for a period of time, or on a base station side, configuration of a beam for downlink sending and/or uplink reception has been replaced for a same CRI, or other reasons cause the base station to consider that a certain loop should not use its historical record values, when the base station re-enables this loop for transmission, the base station sends a PC set parameter to the UE, setting the indication of whether to clear f (i) to yes.

The UE maintains a local closed-loop power adjustment amount f (i) for each loop in all embodiments described above. When a TX beam (group) supports an MIMO multi-flow transmission, and the corresponding multiple streams support an independent power control, the UE should maintain f (i) of the number of MIMO streams in the corresponding TX beam (group) for each PC set loop. The above MIMO multi-flow transmission refers to a multi-transmit block (TB) transmission. When a TX beam (group) supports an MIMO multi-layer transmission, and supports an independent power control, the UE should maintain f (i) of the number of MIMO streams in the corresponding TX beam (group) for each PC set loop.

Preferred Embodiment Eight

When a base station schedules a UE's uplink transmission, many factors need to be determined, which include a time-frequency resource, a transmission rate, a modulation and coding scheme, and an MIMO method, etc. According to a receiving quality, the base station needs to determine which factors need to be adjusted for subsequent scheduling, such as improving the modulation and coding scheme and increasing a sending power, etc. However, the base station does not know a current sending power of the UE, and does not know whether the sending power may be improved. Therefore, a mechanism is provided in the LTE. The UE sends a power headroom report (PHR) to the base station, which clearly notifies a difference between the current sending power and a maximum sending power.

In an NR beam mode, the PHR also needs to consider the changing of the beam. According to the above embodiment, multiple closed-loop power control loops possibly exist between the base station and the UE, and only one TX beam (group) of the UE may be scheduled at one time, which corresponds to one loop. Alternatively, the TX beams (groups) corresponding to multiple loops may be scheduled, and the loops may be different at different times. When multiple TX beams (groups) are sent at the same time, the sending power of each TX beam (group) may be calculated separately. A sum of the actual sending powers is also limited by a maximum sending power of the UE. When the maximum sending power is not sufficient to meet the requirement of the sending power of all TX beams (groups), power reduction may be performed or sending of part of TX beams (groups) may be abandoned. Therefore, the reported PHR should reflect a difference between a sum of powers of multiple TX beams (groups) and the maximum power as a joint PHR. The PHR of a single TX beam (group) is also useful for base station scheduling. Therefore, for a case where multiple loops are used for the same transmission, a PHR reporting may be performed independently for each loop, or one PHR may be reported for multiple loops, or both are provided.

The PHR reporting mode configured by the base station for the UE is one of the following modes. A first mode is to separately report the PHR for each loop. The second mode is to report the PHR for multiple loops together. The third mode is to report a joint PHR for multiple loops and an independent PHR for each of the multiple loops.

Alternatively, the PHR reporting mode configured by the base station for the UE is one of the following modes. The first mode is to separately report the PHR for each TX beam (group). The second mode is to jointly report the PHR for all TX beams (groups) at the same scheduling time of the UE. The third mode is to report a joint PHR of all TX beams (groups) at a unified scheduling time and an independent PHR for each TX beam (group).

When the PHR is independently reported for each loop or each TX beam (group), and the power is calculated, it is assumed that only the TX beam (group) corresponding to the loop or the TX beam (group) indicated by the base station exclusively occupies the sending power.

When a joint PHR for multiple loops or multiple TX beams (groups) is reported, the sending power of the multiple TX beams (groups) corresponding to the multiple loops or multiple TX beams (groups) indicated by the base station needs to be considered when the power is calculated, and a difference between the UE's maximum sending power and the sum as the joint PHR to report.

When the PHR is independently reported for each loop, a trigger condition of the PHR includes at least one of: a PL change of the loop exceeds a predefined threshold; configuration of the loop changes, or the base station reconfigures PC set parameters of the PC set ID corresponding to the loop, or f (i) corresponding to the loop is cleared for reasons in addition to a failure; the configuration of the loop changes, or the base station reconfigures the PC set parameters of the PC set ID corresponding to the loop, or f (i) corresponding to the loop is cleared for reasons in addition to a failure, and a difference between the PHR and the previously reported PHR is greater than the predefined threshold due to the above conditions; the configuration of the loop changes, or the base station reconfigures the PC set parameters of the PC set ID corresponding to the loop, or f (i) corresponding to the loop is cleared for reasons in addition to the failure, and the PHR is caused to be 0, less than 0 or less than the predefined threshold due to the above conditions;

The above conditions may take effect in combination with other conditions. For example, a PHR reporting interval cannot be less than a predefined time amount.

When the PHR is jointly reported for multiple loops (which are called as a loop group), the trigger condition of the PHR includes at least one of: relative to the joint PHR of the loop group reported last time, a sum of the PL changing amount of all loops in the loop group exceeds the predefined threshold; the configuration of at least one loop in the loop group changes, or the base station reconfigures the PC set parameters of the PC set ID corresponding to the at least one loop in the loop group, or f (i) corresponding to the at least one loop in the loop group is cleared for reasons in addition to the failure; the configuration of at least one loop in the loop group changes, or the base station reconfigures the PC set parameters of the PC set ID corresponding to the at least one loop in the loop group, or f (i) corresponding to the at least one loop in the loop group is cleared for reasons in addition to the failure; and the difference between the joint PHR and the previously reported joint PHR is greater than the predefined threshold due to the above conditions; the configuration of at least one loop in the loop group changes, or the base station reconfigures the PC set parameters of the PC set ID corresponding to the at least one loop in the loop group, or f (i) corresponding to the at least one loop in the loop group is cleared for reasons in addition to the failure; and the PHR is caused to be 0, less than 0 or less than the predefined threshold due to the above conditions.

The above conditions may take effect in combination with other conditions. For example, a reporting interval of the PHR cannot be less than a predefined time amount.

For the case of independently reporting the PHR for each loop, each loop needs to maintain a process, and determines whether the trigger condition is met separately.

The number of processes required for the case of joint reporting the PHR for multiple loops needs to be indicated by the base station. If a requirement of frequently switching between receiving and/or sending beams (groups) is provided, i.e., switching between different loop groups, the PHR process needs to be independently maintained for different loop groups; otherwise even if different loops are switched, only the same process is used for maintaining the reporting of the PHR. Therefore, the base station indicates the PHR reporting process for the UE in the following modes.

For one PHR process, the number of PHR process configured by the base station is 1.

For multiple PHR processes, the base station configures the number of PHR processes, and indicates an identifier and a loop ID of each PHR process.

The UE maintains determination and parameter updating related to the trigger condition for each PHR process according to the configuration.

When the number of PHR process is 1, the UE defaults that all activated loops belong to the PHR process.

When the number of PHR processes is greater than 1, the PHR reported by the UE at least carries one of: a PHR process identifier, a joint PHR, a loop ID corresponding to the joint PHR.

When the reported PHR is the joint PHR of multiple loops and the independent PHR of each loop, the trigger condition uses the trigger condition of the joint PHR of multiple loops. PHR information carries the joint PHR and the PHR of the separate loop.

The receiving and sending beam (group) corresponding to the loop may change according to the channel changing. In addition, a loop set enabled for the same PHR process at different times (belonging to a subset of the loop set configured by the PHR process) may be different, the calculation of the joint PHR should be based on a loop currently scheduled.

The calculation of the separate loop PHR reported with the joint PHR needs to assume that the TX beam (group) of other loops is not sent.

A loop included in part of the separate loop PHR reported with the joint PHR is the same as the loop set used in the joint PHR calculation, or the entire loop set configured by the PHR process.

When there is no actual uplink transmission and the PHR reporting is also needed, the reported PHR calculation should be based on that the sending and receiving beams (groups) is the same as the beam configuration of the last successfully transmitted uplink.

Preferred Embodiment Nine

The preferred embodiment describes another power control architecture.

1. A base station configures or reconfigures at least one PC setting parameter for a UE. Each PC setting parameter corresponds to a different application scenario, such as a different service, a different waveform configuration, a different numerology configuration and a different beam resource configuration, etc.

Each PC setting parameter includes at least one of:
a PC setting identifier;
a cell specific configuration parameter, such as P0 cell specific and PCMAX;
a waveform specific configuration parameter, such as a back off value of PCMAX;
a numerology specific configuration parameter, such as a numerology, i.e., a power control parameter related to a configuration of a physical layer frame; or
a traffic specific configuration parameter, such as a power control parameter related to traffic.

The PHR-related configuration parameter includes at least one of:
a PHR switch;
a PHR reporting period;
a minimum PHR reporting interval;
a PL changing amount threshold; or
a type of the PHR.

The type of the PHR is used for determining how the power headroom is calculated.

The PL changing amount threshold is used for determining whether a difference between a current PL and a PL used in last PHR reporting is large enough, which is one condition for triggering the PHR.

At least one PC set is provided, and each PC set includes at least one of:
a PC set identifier;
an indication of whether to clear f (i);
a P0 UE specific value related configuration, including at least one of: a P0 UE specific value;
a PL-related configuration, including at least one of: a DL RS resource, a CRI(s) and/or an SS-block indication;
a combination rule for multiple DL RSs;
an uplink RSRP/PL value; or
an uplink transmitting resource setting, including at least one of: a UL RS resource: such as an SRI; or a DL RS resource: such as a CRI.

The P0 UE specific value related setting and PL-related setting are the same as those described in the embodiment one.

The PC set identifier is valid for more than one PC set and is used for identifying the PC set.

f (i) is a closed-loop power adjustment amount maintained by the UE, and the UE maintains one f (i) for each PC set. When the TX beam (group) in the PC set supports an MIMO multi-flow transmission, and power control of each of multiple streams can be independently performed, the UE should maintain f (i) for each PC set and the quantity of f (i) is equal to the quantity of MIMO streams in the corresponding TX beam (group). The above MIMO multi-flow transmission refers to a multi-transmit block (TB) transmission. When a TX beam (group) supports an MIMO multi-layer transmission, and supports an independent power control, the quantity of f (i) maintained by the UE for each PC setting loop is equal to the quantity of MIMO streams in the corresponding TX beam (group).

A configuration of whether to clear f (i) allows the base station to select, in response to the PC set parameter changing, whether to reserve the f (i) before the changing.

The uplink transmission resource setting is used for indicating the uplink transmission resource of the UE, such as an uplink TX beam (group).

The TX beam (group) may be identified by: the UL RS resource such as a resource indication of the SRS (SRI), or a DL RS resource such as a resource indication of the CSI-RS (CR). An SRS resource indication identifies a UE sending beam (group) used for previously sending the SRS, and a resource indication of the CSI-RS identifies a best receiving beam (group) of the UE corresponding to the previously sent CSI-RS, and takes the best receiving beam (group) as a sending beam (group) of the uplink transmission.

The above description is that the base station sets whether to clear f (i) for each PC set. In addition to this method, it may also be one of methods described below.

The base station configures a PC setting level indication of whether to clear f (i) for the UE. If the PC setting includes multiple sets of PC set parameters, the PC setting level indication is valid for all PC sets in the PC setting.

The base station configures a UE level indication of whether to clear f (i) for the UE. If the UE is configured with multiple sets of PC set parameters, the UE level indication is valid for all PC sets of all PC setting IDs of the UE.

Whether to clear f (i) may be determined by using a default rule, such as PL setting and/or P0 (cell specific P0, or UE specific P0) reconfiguration, then the corresponding f (i) is cleared. In this case, the indication of whether to clear f (i) does not need to be configured for the PC setting parameter.

The base station enables/disables the above-mentioned default rule through indication information. When the default rule is enabled, it does not need to configure whether to clear f (i) in the PC setting parameter, and f (i) is cleared when PL setting and/or P0 is reconfigured. When the default rule is disabled, the PC setting parameter may include whether to clear f (i).

2. The base station indicates the PC setting parameter of the uplink transmission for the UE.

The base station activates or deactivates the PC setting ID for the UE through the MAC CE or the physical layer signaling.

When PC setting ID is activated,
the UE determines a power control related parameter of the UE's uplink transmission through the PC setting parameters identified by the PC setting ID.

Alternatively, the UE determines the power control related parameter of the UE's uplink transmission and the transmitting resource used for the uplink transmission, such as the TX beam (group) through the PC setting ID.

For the activated PC setting ID, the base station may specify that configuration of the PC setting ID is applied in one or more transmissions.

For the activated PC setting ID, the base station may configure its application rules, and the UE applies the configuration of the PC setting ID to all current and subsequent eligible uplink transmissions. The application rules refer to characteristics of the transmission configured by using the PC setting ID, and may include at least one of: channel/signal category, including a PUCCH, a long PUCCH, a short PUCCH, a PUSCH, a specific PUSCH, a specific type SRS.

The specific PUSCH refers to a PUSCH that meets a specific condition, including a PUSCH sent on a specific time/frequency resource, or a PUSCH with a specific number of transmissions, or a PUSCH with a different number.

3. The base station dynamically sends a transmit power control command by the physical layer signaling TPC command information includes one or more power adjustment amounts, corresponding to one or more TX beams (groups). The number of TX beams (groups) is related to a beam (group) of the independent power control of the current transmission, and the corresponding uplink RX beam (group) is implicitly indicated by the PC setting ID.

For details, see a relevant part of the embodiment one.

4. The UE calculates a power of the uplink transmission (PUSCH/PUCCH/SRS) using the following method.

The UE receives higher layer information and obtains one or more sets of PC setting parameters.

The UE determines the power control related parameter of this transmission according to the PC setting ID in the physical layer signaling or the MAC CE.

According to the scheduling information of the physical layer signaling or the MAC CE, or through the PC setting ID, the transmitting resource of this transmission is acquired, such as the TX beam (group).

The UE sets a P0 UE specific value and a PL parameter for each PC set ID in the PC setting parameters.

The UE maintains an independent f (i) for each PC set.

The UE receives the TPC command and applies the command to the corresponding f (i) of the PC set, and adopts an accumulated or non-accumulated manner according to the base station configuration.

After the UE receives the PC setting, if the PC setting includes PL related information, parameter configuration of PL calculation is updated.

Possible combination rules and DL RS resources required for PL calculation are obtained, according to the PC setting ID, from the PC setting parameters configured by higher layer. PL measured in the reception of the DL RS through the receiving beam which is determined by TX beam, is used together with the possible combination rule for calculating the PL for uplink transmission.

The UE performs a possible clearing operation on f (i) of each PC set according to indication of whether to clear f (i) in the received PC setting or according to the rule configured by the base station for the UE.

PL, P0, f (i) are used for calculating the power of this uplink transmission.

5. the UE reports the PHR to the base station

The UE maintains an independent PHR trigger condition for the activated PC setting ID. When the trigger condition is satisfied, and sufficient uplink resources are provided, the PHR is reported to the base station.

Alternatively, the UE maintains an independent PHR trigger condition for the PC setting ID with an enabled PHR switch. When the trigger condition is satisfied, and sufficient uplink resources are provided, the PHR is reported to the base station.

When there is no actual uplink transmission, the UE uses the parameter configured by the PC setting ID to determine parameters required by the PHR calculation, such as the TX beam (group), the P0, the PL configuration, the PCMAX, etc.

(Regarding Use Rules of the PL Threshold in the Trigger Condition)

The UE calculates the PL for each PC set in the PC setting. The PHR trigger condition corresponding to the PC setting includes at least one of: with respect to the time of the last reporting of the PHR corresponding to this PC setting, a sum of the PL changing amounts of all PC sets exceeds the predefined threshold, i.e., the PL changing amount threshold.

Preferred Embodiment Ten

Figure 7:
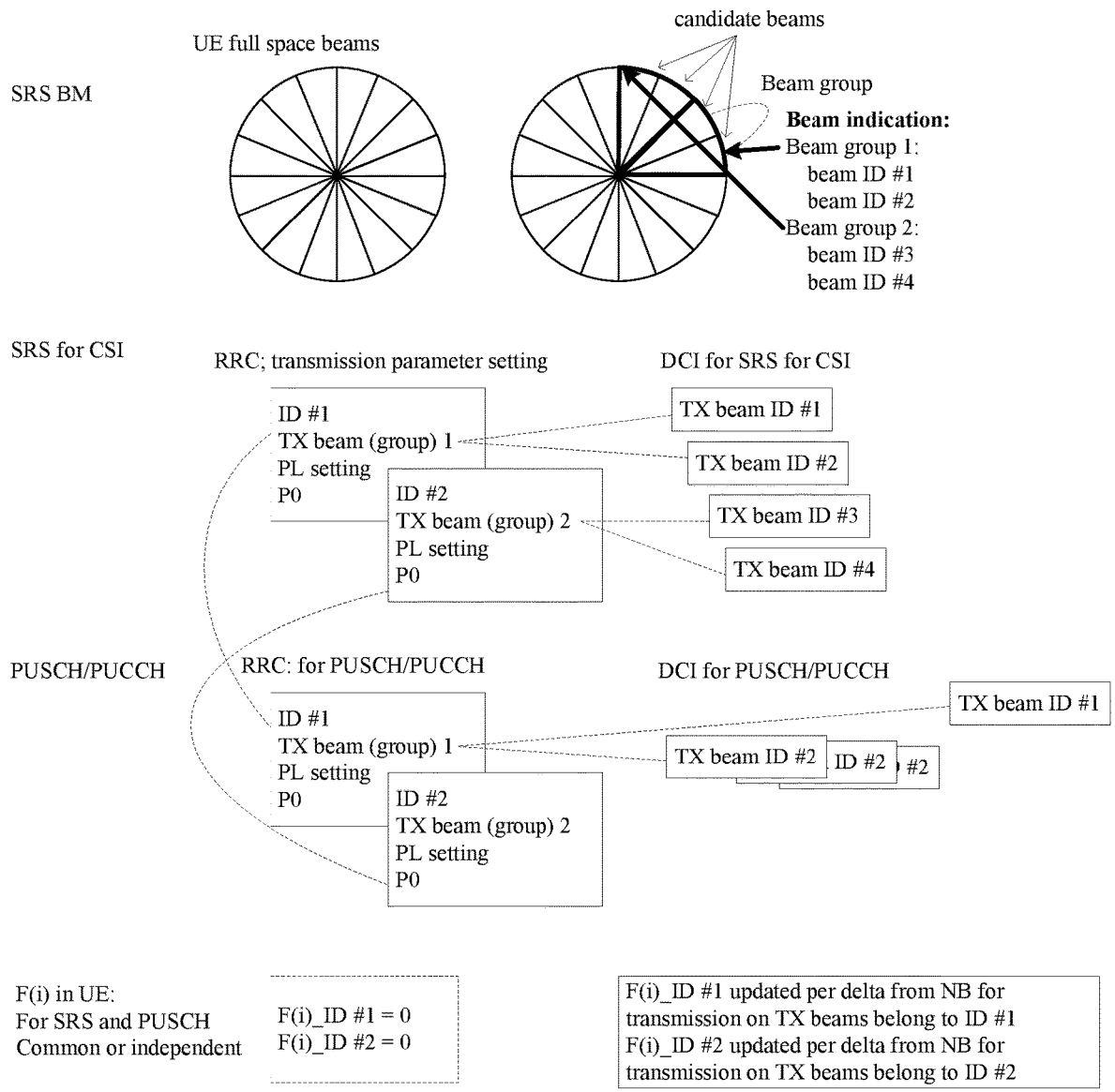
FIG. 7 is a schematic diagram of a method provided by a preferred embodiment ten of the present application.

FIG. 7 is a schematic diagram of a method provided by a preferred embodiment ten of the present application. As shown in FIG. 7, in a beam management (BM) process, a base station and a UE perform beam trainings, select beams with a better quality for subsequent communication. In an uplink direction, the base station configures the UE to send a sounding reference signal (SRS). The SRS is transmitted on multiple beam resources. The base station may select a best beam or beams for the UE as a candidate beam(s) by measuring the SRS. The base station notifies the UE of the selection result about the candidate beam(s) in a certain manner, and these candidate beam(s) may also be grouped. For example, as shown in FIG. 7, the base station selects 4 candidate beam sets for the UE, and each two are grouped into one group. Therefore, the candidate beam sets indicated by the base station to the UE are: beam ID #1, beam ID #2, beam ID #3, beam ID #4. Alternatively, the candidate beam sets may also be indicated in groupings: a beam group 1, a beam group 2. In this case, a mapping between the beam group and the actual beams is determined by the UE. The grouping mode may also be configured by the base station: the beam group 1 includes beam ID #1 and beam ID #2, and the beam group 2 includes beam ID #3 and beam ID #4.

In short, the base station configures, for the UE, candidate beam sets, beam group sets, and/or beam sets. The UE may acquire a correspondence between the beam group and the actual beams.

The candidate beam set includes currently used beams and spare beams.

The base station configures at least one transmission parameter set for each uplink transmission channel/signal of the UE separately.

Each transmission parameter setting includes at least one transmission parameter set. The transmission parameter set includes at least one of: ID information, a TX beam (group) ID, a PL setting, or a P0.

The TX beam (group) ID may be an SRS resource indication (SRI), which represents a transmitting resource of the indicated SRS, such as a sending beam or beam group. The TX beam group ID may also refer to a group composed of multiple beam sets, such as the concept of the beam group described above.

The PL setting may be indicated in an SRS resource, or an SRS resource setting, or an SRS resource set. Contents included in the PL setting are described in the description of PL in the embodiment one.

P0 refers to a beam-related part or a P0 UE specific part, and its meaning is described in the related description of the embodiment one.

ID information refers to identifiers of parameter sets described above. This information may also be used as a logical identifier, and the TX beam (group) ID is used for replacing the identifier information and is used for indexing.

Each transmission parameter set may further include: information on whether to clear f (i), and its meaning is described in the related description of the embodiment one.

Information of the transmission parameter set and the transmission parameter setting may be only a logical combination, and actually may be distributed in messages of different levels or different types. For example, the TX beam (group) ID and the PL setting may be in configuration related to the SRS source, and P0 may be in a message related to the transmission, such as P0 indicating the PUSCH in transmission parameter related information of the PUSCH, and in transmission parameter related information of the SRS.

Information in the transmission parameter setting configured by the base station for the SRS of the UE may be shared by PUSCH and PUCCH transmissions.

The transmission parameter setting is at least for different transmission channel/signal configurations. Each transmission channel and signal may also be configured with multiple transmission parameter settings. The transmission parameter set may correspond to all or part of the candidate beams.

As shown in FIG. 7, after completing the beam scanning, the base station determines for the UE 4 candidate beams, which are divided into two groups.

The base station configures one SRS transmission parameter setting for the UE, which includes two transmission parameter sets.

The base station configures PUSCH and PUCCH transmission parameter settings for the UE, each including two transmission parameter sets. The two transmission parameter sets correspond to the two transmission sets in the SRS transmission parameter setting separately. The association relationship may be an ID number or a TX beam (group) number.

For ease of description here, it is assumed that the ID exists, the ID number and a transmission set number in FIG. 7 are provided. A transmission parameter set identified by ID #1 in the PUSCH transmission parameter setting and a transmission parameter identified by ID #1 in SRS transmission parameter setting share the TX beam (group) and the PL setting. Therefore, these two parameters may be omitted in the PUSCH transmission parameter setting, and marked grey in FIG. 7. ID #2 is also similar.

The PUCCH transmission setting is similar to the PUSCH transmission setting. The same parameter may also be shared through the same transmission set ID or TX beam (group) ID.

The base station configures the TX beam (group) for the transmission of the UE through physical layer information, such as DCI. The UE determines the transmission parameter set according to a relationship between the configured TX beam and the TX beam (group) in the transmission parameter setting, and applies information such as P0 and PL setting.

As shown in FIG. 7, TX beam IDs #1 and #2 indicated by the DCI belong to transmission set ID #1 in the transmission parameter setting, and TX beam IDs #3 and #4 indicated by the DCI belong to transmission set ID #2 in the transmission parameter setting.

The UE maintains a local power adjustment amount f (i) for each transmission set of each transmission parameter setting, and updates f (i) according to a TPC command sent of each transmission set by the base station.

Reconfiguration of P0 by the base station causes f (i) related to the corresponding transmission parameter set to be cleared.

Reconfiguration of PL by the base station causes f (i) related to the corresponding transmission parameter set to be cleared.

Preferred Embodiment Eleven

Figure 8:
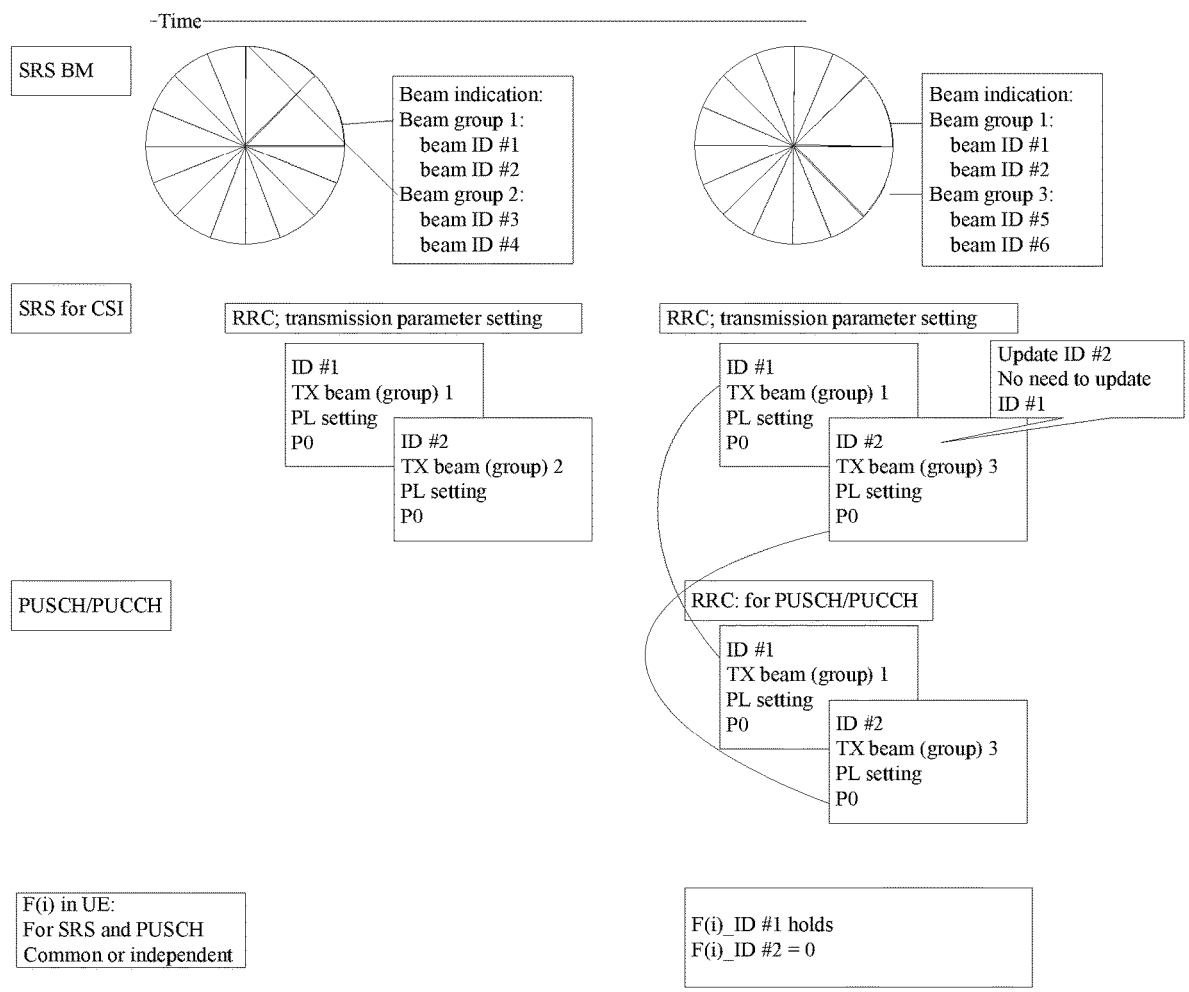
FIG. 8 is a schematic diagram of a method provided by a preferred embodiment eleven of the present application.

FIG. 8 is a schematic diagram of a method provided by a preferred embodiment eleven of the present application. As shown in FIG. 8, when a candidate beam set changes, a base station needs to reconfigure an SRS transmission parameter setting for a UE. Reconfiguration may only be performed for part of transmission parameter sets, while transmission parameter sets that have not been reconfigured maintain the original parameters.

As shown in FIG. 8, compared with candidate beam sets in the left in FIG. 8, in candidate beam sets in the right, beams of a beam group 1 are not changed, PL setting and P0 also are not changed, so no reconfiguration is required, and beams of a beam group 2 are changed and the beam group 2 is not in the candidate beam sets, and a beam group 3 is selected into the candidate beam sets, so the base station needs to update beam set information to the UE.

In the SRS transmission parameter setting, a transmission set of ID #1 does not need to be reconfigured, and a transmission set of ID #2 needs to be reconfigured.

A PUSCH and a PUCCH may share a TX beam (group) and a PL setting in SRS transmission parameters. P0s of the PUSCH and the PUCCH need to be reconfigured.

When the reconfigured transmission parameter set of ID #2 is received, the UE resets f (i) of ID #2, i.e., clearing processing.

Preferred Embodiment Twelve

A base station configures one or more PHR settings for a UE, and each PHR setting includes at least one of: timers, a PL changing threshold, or a PHR process indication and a PHR process related configuration.

Timers include, for example, a PHR reporting period, and a minimum time interval for reporting the PHR.

For the PL changing threshold, please refer to description in the embodiment eight.

Figure 9:
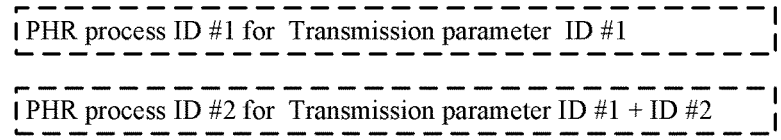
FIG. 9 is a schematic diagram of performing a related configuration with a PHR provided by a preferred embodiment twelve of the present application.

For the PHR process indication and the PHR process related configuration, FIG. 9 is a schematic diagram showing related configuration for PHR provided by a preferred embodiment twelve of the present application. As shown in FIG. 9, ID #1 is configured in the PHR process #1 and ID #1 and ID #2 are configured in the PHR process #2.

Then the UE configures a PHR process for each PHR process and maintains the PHR trigger conditions separately.

The PHR information includes at least one of: PHR setting identification information or PHR setting identification information.

The PHR setting identification information is, for example, a PHR setting ID. The PHR setting ID may also be shared with a transmission parameter setting ID, i.e., when the PHR is configured, the transmission parameter setting ID is used for identification.

The meaning of the transmission parameter setting ID is the same as that in the above embodiments.

The PHR setting identification information is, for example, a PHR process ID.

Preferred Embodiment Thirteen

A base station may feed back an uplink measurement result RSRP/PL to a UE. After receiving RSRP/PL information, the UE updates a local PL, and also needs to update a local f (i) according to a PL changing amount to ensure the power adjustment consistency.

Whenever the UE receives the RSRP/PL information sent by the base station, if the RSRP is received, an equivalent PL needs to be calculated according to the power of the uplink RS previously sent by the UE and for measuring a RSRP value by the base station, and then the UE performs: updating the UE's local PL, and updating the UE's local closed-loop power adjustment amount f (i) according to a difference between the new PL and the PL before the updating.

Examples are Given Below

It is assumed that during the initial uplink transmission, the base station sends a PL for the uplink transmission, which is assumed to be 40. In this case, f is 0. After several uplink transmissions and closed-loop power adjustment commands sent by the base station, at a subframe i, an accumulated local f of the UE is to f (i)=4 dB. The multiple closed-loop power adjustment commands imply that the PL is changed, but the base station did not send additional information to notify the UE of the PL changing amount. At a subframe i+1, the base station notifies the UE to update the PL to 45. In this case, the UE needs to ensure that at least the previous PL+f (i)=the new PL+f (i+1), i.e., 40+4=45+(−1). Therefore, after the UE adjusts the PL, f (i+n) becomes −1. Here f (i+1) does not consider the TPC command sent by the base station. If the TPC command is received, f (i+n) is updated according to the power adjustment amount in the TPC command.

The base station sets an RSRP/PL value through PL related parameters in the PC setting parameters. Maintaining an independently updated PL is conducive to sharing the PL between multiple channels, such as the PUSCH, the PUCCH, and the SRS, with a premise that the UE's sending beams are the same and correspond to the same PC setting ID.

Preferred Embodiment Fourteen

A base station configures a PL measurement related parameter for a UE. The UE may calculate an uplink PL according to the configured DL RS measurement. The base station may also send the uplink RSRP/PL for the UE to update the local PL of the UE. The UE should update the local PL after receiving the uplink PL sent from the base station. Before the next uplink PL sent from the base station is received, the measured downlink PL is used as a reference to update the PL. Two ways to update the PL are provided.

A method a is as follow. The difference between the PL measured the local downlink and the uplink PL sent from the base station, and this error is considered to be fixed. The fixed difference is used for adjusting a subsequent PL obtained by a new downlink RS measurement, and the subsequent PL is used as a PL parameter for the uplink transmission.

A method b is as follows. The PL is updated by using a PL weighted average of the uplink PL sent by the base station and the PL obtained in the subsequent downlink RS measurement. Time is considered. The longer the time with respect to the last update, the smaller the weighted value of the uplink PL sent by the base station is.

The selection of methods a and b may be predefined or configured by the base station in PC setting parameters.

Apparently, it is to be understood by those skilled in the art that each of the above-mentioned modules or steps of the present application may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executable by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above are only preferred embodiments of the present application and are not intended to limit the present application, and for those skilled in the art, the present application may have various modifications and variations. Any modifications, equivalent substitutions, improvements and the like made within the principle of the present application should fall within the scope of the present application.

We claim:

1. A method for parameter configuration, comprising:
configuring, by a base station, a first transmission parameter set for a user equipment, the first transmission parameter set comprising path loss configuration information;
sending, by the base station to the user equipment through physical layer signaling, scheduling information indicating an uplink transmitting resource, wherein the uplink transmitting resource is indicated by resource indication information of a sounding reference signal (SRS) from the user equipment; and
indicating, by the base station to the user equipment, the path loss configuration information in a SRS resource set for the uplink transmitting resource, wherein the path loss configuration information includes indication information of a downlink reference signal (DL RS) resource for the user equipment to perform path loss measurement using the path loss configuration information in the SRS resource set, and wherein the first transmission parameter set has an association relationship with the uplink transmitting resource for the user equipment to determine a power of a physical uplink shared channel (PUSCH).

2. The method of claim 1, wherein the indication information of the first downlink reference signal resource used for path loss measurement comprises: a channel state information reference signal resource indication, or a synchronization signal block resource indication.

3. A method for power determination, comprising:
acquiring, by a user equipment through physical layer signaling from a base station, scheduling information that includes an uplink transmitting resource, wherein the uplink transmitting resource is indicated by resource indication information of a sounding reference signal (SRS) from the user equipment;
determining, from at least one transmission parameter set, a first transmission parameter set having an association relationship with the uplink transmitting resource, wherein the first transmission parameter set comprises path loss configuration information,
obtaining, by the user equipment, the path loss configuration information indicated by the base station in a SRS resource set for the uplink transmitting resource, wherein the path loss configuration information includes indication information of a downlink reference signal (DL RS) resource for the user equipment to perform path loss measurement using the path loss configuration information in the SRS resource set; and
determining a power of a physical uplink shared channel (PUSCH) transmission according to the determined first transmission parameter set.

4. The method of claim 3, wherein the indication information of the first downlink reference signal resource used for path loss measurement comprises a channel state information reference signal resource indication, or a synchronization signal block resource indication.

5. A device for parameter configuration, comprising:
at least one processor configured to:
configure a first transmission parameter set for a user equipment, the first transmission parameter set comprising path loss configuration information;
send, to the user equipment through physical layer signaling, scheduling information indicating an uplink transmitting resource, using wherein the uplink transmitting resource is indicated by resource indication information of a sounding reference signal (SRS) from the user equipment,
indicate, to the user equipment, the path loss configuration information in a SRS resource set for the uplink transmitting resource, wherein the path loss configuration information includes indication information of a downlink reference signal (DL RS) resource for the user equipment to perform path loss measurement using the path loss configuration information in the SRS resource set, and
wherein the first transmission parameter set has an association relationship with the uplink transmitting resource for the user equipment to determine a power of a physical uplink shared channel (PUSCH).

6. The device of claim 5, wherein the indication information of the first downlink reference signal resource comprises a channel state information reference signal resource indication, or a synchronization signal block resource indication.

7. A device for power determination, comprising:
at least one processor configured to:
acquire, from a base station through physical layer signaling, scheduling information that indicates an uplink transmitting resource, wherein the uplink transmitting resource is indicated by resource indication information of a sounding reference signal (SRS);
determine, from at least one transmission parameter set, a first transmission parameter set having an association relationship with the uplink transmitting resource,
wherein the first transmission parameter set comprises path loss configuration information,
obtain the path loss configuration information indicated by the base station in a SRS resource set for the uplink transmitting resource; wherein the path loss configuration information includes indication information of a downlink reference signal (DL RS) resource for the user equipment to perform path loss measurement using the path loss configuration information in the SRS resource set; and
determine a power of a physical uplink shared channel (PUSCH) transmission according to one determined first transmission parameter set.

8. The device of claim 7, wherein the indication information of the first downlink reference signal resource used for path loss measurement comprises a channel state information reference signal resource indication, or a synchronization signal block resource indication.

9. A non-transitory storage medium, comprising stored instructions, which when executed by one or more processors can cause the one or more processors to perform the method of claim 1.

10. A non-transitory storage medium, comprising stored instructions, which when executed by one or more processors can cause the one or more processors to perform the method of claim 2.

11. A non-transitory storage medium, comprising stored instructions, which when executed by one or more processors can cause the one or more processors to perform the method of claim 3.

* * * * *